(12) United States Patent
Montemurro et al.

(10) Patent No.: US 11,665,629 B2
(45) Date of Patent: May 30, 2023

(54) SYSTEMS AND METHODS FOR OUTSIDE THE CONTEXT OF A BSS (OCB) COMMUNICATIONS IN UNLICENSED BANDS

(71) Applicants: Michael Montemurro, Toronto (CA); Stephen McCann, Rownhams (GB); Osama Aboul-Magd, Ottawa (CA); Kwok Shum Au, Ottawa (CA); Jung Hoon Suh, Ottawa (CA); Mohamed Adel Salem, Ottawa (CA)

(72) Inventors: Michael Montemurro, Toronto (CA); Stephen McCann, Rownhams (GB); Osama Aboul-Magd, Ottawa (CA); Kwok Shum Au, Ottawa (CA); Jung Hoon Suh, Ottawa (CA); Mohamed Adel Salem, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 211 days.

(21) Appl. No.: 17/160,067

(22) Filed: Jan. 27, 2021

(65) Prior Publication Data

US 2022/0240165 A1    Jul. 28, 2022

(51) Int. Cl.
*H04W 4/00* (2018.01)
*H04W 48/16* (2009.01)
(Continued)

(52) U.S. Cl.
CPC ............ *H04W 48/16* (2013.01); *H04W 4/02* (2013.01); *H04W 8/005* (2013.01); *H04W 48/08* (2013.01); *H04W 76/14* (2018.02); *H04W 84/12* (2013.01)

(58) Field of Classification Search
CPC ....... H04W 48/16; H04W 48/08; H04W 4/02; H04W 76/14; H04W 8/005; H04W 84/12; H04W 84/18
(Continued)

(56) References Cited

U.S. PATENT DOCUMENTS 11,470,618 B2 * 10/2022 Zhou ...................... H04L 5/0055
11,470,654 B2 * 10/2022 Deogun ............ H04W 72/0453
(Continued)

FOREIGN PATENT DOCUMENTS

EP          3304988 A1    4/2018
WO      2017005293 A1    1/2017
(Continued)

OTHER PUBLICATIONS

C. A. Grazia, "On the Performance of IEEE 802.11p Outside the Context of a BSS Networks," 2018 IEEE 29th Annual International Symposium on Personal, Indoor and Mobile Radio Communications (PIMRC), 2018, pp. 1388-1393, doi: 10.1109/PIMRC.2018.8580785.

*Primary Examiner* — Marceau Milord

(57) ABSTRACT

Methods and apparatuses for supporting outside the context of a basic service set (OCB) concurrent with infrastructure-based communications, including cellular communications or basic service set (BSS) communications, are described. OCB service information is transmitted by an infrastructure unit in an infrastructure-based communication. The OCB service information include a service identifier and channel information for each available OCB service. The infrastructure unit may then communicate with a terminal unit over an OCB communication link, to provide an OCB service to the terminal unit. The OCB service information may be com-
(Continued)

municated in an OCB operation information element (IE) including a service hash field and an operating class and channel field.

18 Claims, 12 Drawing Sheets

(51) Int. Cl.
  *H04W 48/08* (2009.01)
  *H04W 4/02* (2018.01)
  *H04W 76/14* (2018.01)
  *H04W 8/00* (2009.01)
  *H04W 84/12* (2009.01)

(58) Field of Classification Search
  USPC .......................................... 370/329, 331, 311
  See application file for complete search history.

(56) References Cited

U.S. PATENT DOCUMENTS

| | | | | |
|---|---|---|---|---|
| 2014/0073288 A1* | 3/2014 | Velasco | ................... | H04W 4/02 |
| | | | | 455/411 |
| 2014/0269658 A1* | 9/2014 | Sadasivam | ............. | H04W 4/06 |
| | | | | 370/338 |
| 2015/0365790 A1* | 12/2015 | Edge | ..................... | H04W 76/50 |
| | | | | 455/456.1 |
| 2016/0270118 A1* | 9/2016 | He | ......................... | H04W 74/06 |
| 2017/0099648 A1* | 4/2017 | Malik | ................... | H04W 64/00 |
| 2019/0075607 A1* | 3/2019 | Park | ...................... | H04W 76/14 |
| 2019/0082348 A1* | 3/2019 | Kim | ........................ | H04W 4/24 |
| 2019/0116545 A1* | 4/2019 | Verma | ................ | H04W 72/0446 |
| 2019/0124660 A1* | 4/2019 | Huang | ................. | H04W 76/14 |
| 2019/0141620 A1* | 5/2019 | Pujari | ................... | H04W 48/16 |
| 2019/0200171 A1* | 6/2019 | Huang | ............. | H04W 72/0446 |
| 2020/0221400 A1* | 7/2020 | Corsica | .................. | H04W 4/80 |
| 2020/0229032 A1* | 7/2020 | McCann | ................ | H04W 84/18 |
| 2020/0267632 A1* | 8/2020 | Lindheimer | .......... | H04W 48/16 |
| 2020/0351357 A1* | 11/2020 | Lee | ......................... | H04L 67/51 |
| 2020/0389869 A1* | 12/2020 | Patil | ....................... | H04W 12/069 |
| 2021/0058856 A1* | 2/2021 | Qi | ......................... | H04W 48/16 |
| 2021/0075675 A1* | 3/2021 | Cavalcanti | .......... | H04L 41/0823 |
| 2021/0266817 A1* | 8/2021 | Wallentin | ............. | H04W 36/08 |
| 2021/0329642 A1* | 10/2021 | Chen | ................... | H04W 74/006 |
| 2021/0385865 A1* | 12/2021 | Mueck | ............... | H04W 74/006 |
| 2022/0256634 A1* | 8/2022 | Kim | ........................ | H04W 76/19 |
| 2022/0312324 A1* | 9/2022 | Thangarasa | .......... | H04W 76/27 |

FOREIGN PATENT DOCUMENTS

| | | | | |
|---|---|---|---|---|
| WO | | 2019139194 A1 | 7/2019 | |
| WO | WO-2020142832 A1 | * | 7/2020 | ........... H04L 1/1685 |

* cited by examiner

SYSTEMS AND METHODS FOR OUTSIDE THE CONTEXT OF A BSS (OCB) COMMUNICATIONS IN UNLICENSED BANDS

FIELD

The present disclosure relates to outside the context of a BSS (OCB) communications, in particular systems and methods for OCB communications in unlicensed bands, including systems and methods supporting infrastructure-based communications, including BSS or cellular communications, concurrent with OCB communications. The disclosed systems and methods may also apply to licensed band operation.

BACKGROUND

IEEE 802.11p is an amendment to the IEEE 802.11 standard. Outside the context of a basic service set (OCB) mode is a communication mechanism that was introduced in IEEE 802.11p to support intelligent transportation system (ITS) communications. IEEE P802.11bd builds on IEEE 802.11p and defines a stateless data transport for wireless access in vehicular environments (WAVE). WAVE is defined in IEEE 1609 standards, and other standards (notably SAE and ISO standards) have been developed to define various applications implemented using the IEEE 1609 standards.

The primary use of OCB mode, as defined in IEEE 802.11p, was to provide a data exchange mechanism for ITS communications. ITS communications include vehicle-to-vehicle (V2V) communications and more generally vehicle-to-everything (V2X) communications. For example, ITS communications may include transmission of data frames by vehicles and roadside monitor stations (e.g., to communicate location, trajectory, road conditions, etc.).

OCB mode provides a mechanism for data exchange without the need to first establish a communication link in a basic service set (BSS). OCB transmissions do not require link setup between vehicles, and OCB frames can be transmitted opportunistically. In general, OCB mode is useful for WAVE applications due to the fact that a moving vehicle may have a communication link with stationary roadside infrastructure for only a short time interval. It would be useful to support OCB communications in other applications.

SUMMARY

The present disclosure describes example methods and apparatuses that enables an infrastructure unit to concurrently support OCB communications and infrastructure-based communications (e.g., cellular communications or BSS communications).

The examples disclosed herein may enable OCB communications to be used in licensed and unlicensed bands, and to be used in ITS applications and non-ITS applications (e.g., in IoT applications).

In some example aspects, the present disclosure describes an apparatus for outside the context of a basic service set (OCB) communications. The apparatus includes a memory, at least one communications interface supporting OCB communications and at least one same or different communications interface supporting infrastructure-based communications, and a processing device. The processing device is configured to execute instructions stored in the memory to cause the apparatus to: transmit, in an infrastructure-based communication, OCB service information about one or more available OCB services, the OCB service information including, for each of the one or more available OCB services, a service identifier and channel information; and communicate with a terminal unit over an OCB communication link, to provide at least one of the one or more available OCB services to the terminal unit.

In any of the above examples, the OCB service information may be transmitted in response to receipt of a transmission from the terminal unit.

In any of the above examples, the transmission from the terminal unit may include information for determining a location of the terminal unit, and the OCB service information may be transmitted in response to determining that the one or more available OCB services are available at the determined location of the terminal unit.

In any of the above examples, the OCB service information may be transmitted in a probe response or a beacon frame.

In any of the above examples, the OCB service information may be transmitted in a remaining minimum system information (RMSI) signal or in a radio resource control (RRC) signal.

In any of the above examples, the processing device may be configured to execute instructions to further cause the apparatus to: establish an infrastructure-based communication link with the terminal unit; and communicate configuration information for the at least one of the one or more available OCB services over the infrastructure-based communication link.

In any of the above examples, the infrastructure-based communication link may be one of: a cellular communication link; or a basic service set (BSS) communication link.

In any of the above examples, the OCB service information may be transmitted in an OCB operation information element (IE). The OCB operation IE may include at least, for each of the one or more available OCB services: a service hash field containing a hash value as the service identifier; and an operating class and channel field containing the channel information.

In any of the above examples, the OCB operation IE may further include a number of OCB services field indicating a count of the one or more available OCB services.

In any of the above examples, the OCB operation IE may further include at least, for at least one of the one or more available OCB services: a service information flags field, a civic location type field, a location civic subelement field, and an optional subelements field. The service information flags field may contain information indicating presence of the civic location type field, location civic subelement field, and optional subelements field; and the civic location type field, location civic subelement field, and optional subelements field provide information about a coverage area of the least one OCB service.

In some example aspects, the present disclosure describes an apparatus for outside the context of a basic service set (OCB) communications. The apparatus includes a memory, at least one communications interface supporting OCB communications, and a processing device. The processing device is configured to execute instructions stored in the memory to cause the apparatus to: receive, in an infrastructure-based communication, OCB service information about one or more available OCB services, the OCB service information including, for each of the one or more available OCB services, a service identifier and channel information; and communicate with an infrastructure unit over an OCB communication link, to access an identified OCB service of the one or more available OCB services, the identified OCB service being identified using the received OCB service information.

In any of the above examples, the processing device may be configured to execute instructions to further cause the apparatus to: transmit a probe request or periodic message to the infrastructure unit. The OCB service information may be received in response to the probe request or periodic message.

In any of the above examples, the OCB service information may be received in a probe response or a beacon frame.

In any of the above examples, the OCB service information may be received in a remaining minimum system information (RMSI) signal or in a radio resource control (RRC) signal.

In any of the above examples, the OCB service information may be received in a RRC signal while the apparatus is in a RRC_CONNECTED state.

In any of the above examples, the processing device may be configured to execute instructions to further cause the apparatus to: establish an infrastructure-based communication link with the infrastructure unit; and receive configuration information for at least the identified OCB service over the infrastructure-based communication link.

In any of the above examples, the infrastructure-based communication link may be one of: a cellular communication link; or a basic service set (BSS) communication link.

In any of the above examples, the OCB service information may be received in an OCB operation information element (IE). The OCB operation IE may include at least, for each of the one or more available OCB services: a service hash field containing a hash value as the service identifier; and an operating class and channel field containing the channel information.

In any of the above examples, the OCB operation IE further may include a number of OCB services field indicating a count of the one or more available OCB services.

In some example aspects, the present disclosure describes a method for outside the context of a basic service set (OCB) communications. The method includes: transmitting, in an infrastructure-based communication, OCB service information about one or more available OCB services, the OCB service information including, for each of the one or more available OCB services, a service identifier and channel information; and communicating with a terminal unit over an OCB communication link, to provide at least one of the one or more available OCB services to the terminal unit.

In some example aspects, the present disclosure describes a method for outside the context of a basic service set (OCB) communications. The method includes: receiving, in an infrastructure-based communication, OCB service information about one or more available OCB services, the OCB service information including, for each of the one or more available OCB services, a service identifier and channel information; and communicating with an infrastructure unit over an OCB communication link, to access an identified OCB service of the one or more available OCB services, the identified OCB service being identified using the received OCB service information.

In some example aspects, the present disclosure describes a computer-readable medium having instructions stored thereon, wherein the instructions, when executed by a processing device of an apparatus, cause the apparatus to perform any of the methods described above.

In some example aspects, the present disclosure describes an outside the context of a basic service set (OCB) operation information element (IE). The OCB operation IE includes at least, for each of one or more available OCB services: a service hash field containing a hash value as the service identifier; and an operating class and channel field containing the channel information.

In any of the above examples, the OCB operation IE may further include a number of OCB services field indicating a count of the one or more available OCB services.

BRIEF DESCRIPTION OF FIGURES

Reference will now be made, by way of example, to the accompanying drawings which show example embodiments of the present application, and in which.

Similar reference numerals may have been used in different figures to denote similar components.

DETAILED DESCRIPTION

Figure 1:
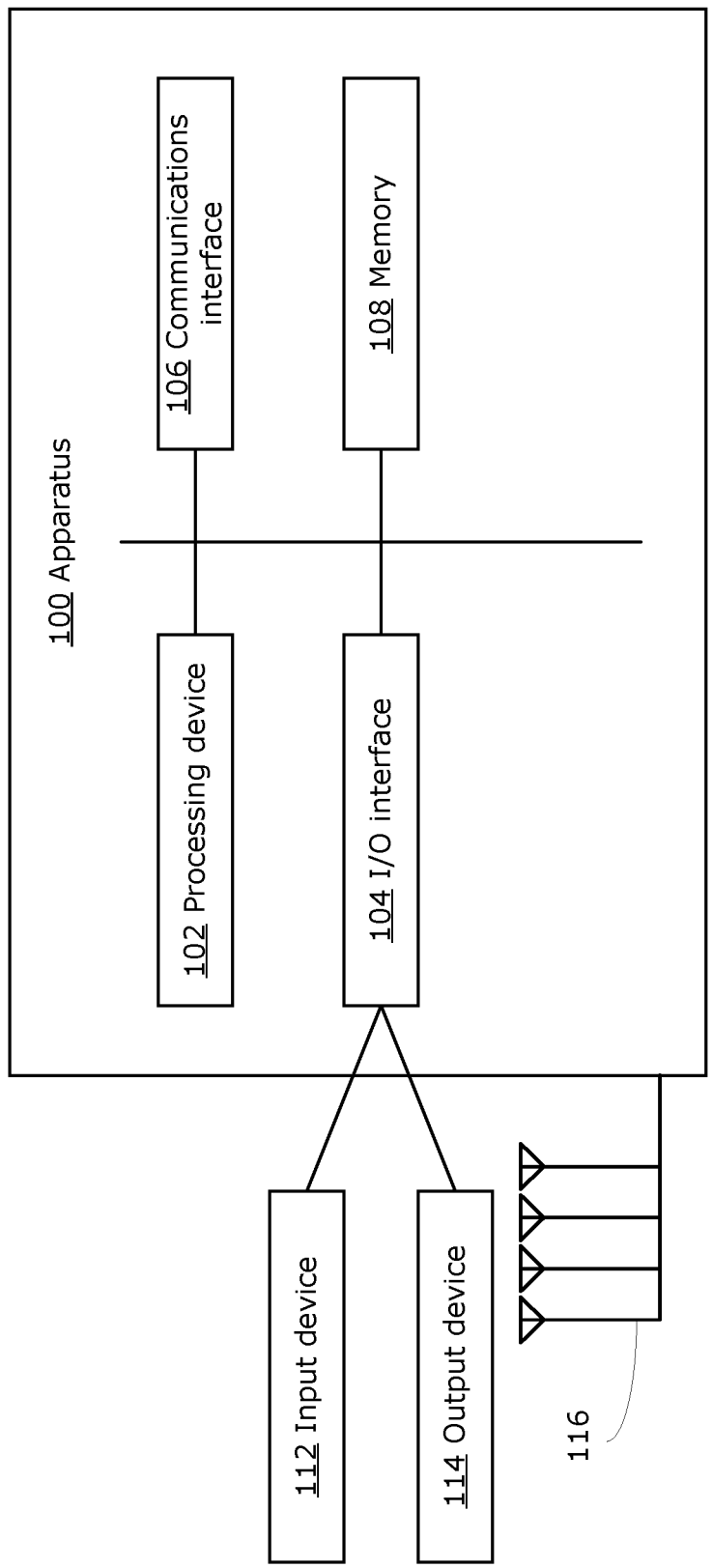
FIG. 1 is a block diagram illustrating an example apparatus suitable for implementing examples disclosed herein.

Outside the context of a basic service set (OCB) mode is a communication mode that was introduced in the IEEE 802.11p amendment. OCB mode provides a mechanism for stations (STAs) to transmit data frames in a stateless manner. OCB transmissions do not require any link setup, OCB frames can be transmitted in an opportunistic manner, and no authentication or association by a STA is necessary to communicate. The only parameter to be configured at the STA is the channel to be used for OCB communications. IEEE 802.11p defines OCB mode primarily for use in intelligent transportation system (ITS) communications, including vehicle-to-everything (V2X) communications (which encompass vehicle-to-vehicle (V2V) communications). In existing V2X applications, the channel to be used for communications is typically known beforehand and is typically assigned as part of the definition of the particular V2X application at a higher layer. Communications are typically broadcast addressed or pairwise unicast addressed.

OCB communications may be suitable for other applications, such as applications using licensed and unlicensed bands. For example, OCB communications may be suitable for applications involving very high mobility devices (e.g., devices that rapidly move in and out of the coverage area of stationary network infrastructure), applications having lower latency requirements, opportunistic applications (e.g., devices that only communicate opportunistically with other devices within range), and/or applications that do not rely on link-driven security (e.g., relying on application-driven security at a higher layer). Some possible applications for OCB communications in licensed and unlicensed bands include Internet of Things (IoT) communications, drone communications (e.g., infrastructure-to-drone communications, as well as drone-to-drone communications (which may be considered a form of V2V communications)), rail control signaling communications, data backhaul communications, asynchronous inter-STA communications, as well as ITS communications, among other possibilities.

To support the extension of OCB communications to applications in unlicensed bands, the present disclosure describes systems and methods that enable an infrastructure unit to support OCB communications in unlicensed bands as well as non-OCB communications (e.g., infrastructure-based communications, including cellular communications and/or communications in a basic service set (BSS)). In particular, communications on an unlicensed band typically require a master device (e.g., an infrastructure unit) to manage communications on the unlicensed band.

To assist in understanding the present disclosure, some terminology is first introduced. In the present disclosure, a STA may refer to any radio (or wireless) termination point. That is, a STA may be any electronic apparatus having wireless communication capabilities. The term STA may encompass both infrastructure units and terminal units, may encompass both mobile and non-mobile units, and may encompass both terrestrial and non-terrestrial units.

In the present disclosure an infrastructure unit refers to a wireless-capable electronic apparatus that provides access to a network. An infrastructure unit may include (or be) a base station (BS), a base transceiver station (BTS), a Node-B (NodeB), an evolved NodeB (eNodeB or eNB), a Home eNodeB, a gNodeB (gNB; sometimes called a next-generation Node B), a transmission point (TP), a transmit and receive point (TRP), a personal basic service set (PBSS) coordinate point (PCP), a satellite, a site controller, an access point (AP), an AP Multi Link Device (AP MLD) or a wireless router, among other possibilities. The present disclosure describes example infrastructure units that provide access to a cellular network or to a BSS (e.g., in a wireless local area network (WLAN)). However, it should be understood that an infrastructure unit may provide access to other types of networks.

In the present disclosure a terminal unit refers to a wireless-capable electronic apparatus that does not provide direct access to a network. A terminal unit accesses a network via a communication link with an infrastructure unit. In some examples, a terminal unit may act as a relay to forward communications between another terminal unit and an infrastructure unit; however the terminal unit that serves as a relay may not be considered an infrastructure unit. A terminal unit may include (or be) a wireless transmit/receive unit (WTRU), customer premises equipment (CPE), a smart device, an Internet of Things (IoT) device, a wireless-enabled vehicle, a mobile station, a fixed or mobile subscriber unit, a cellular telephone, a machine type communication (MTC) device, a user equipment (UE), an end client, a personal digital assistant (PDA), a smartphone, a laptop, a computer, a tablet, a wireless/wireline sensor, or a consumer electronics device, among other possibilities. In some contexts, a terminal unit may also be referred to as a non-AP STA or a non-AP MLD.

In the present disclosure, an infrastructure unit may be capable of supporting infrastructure-based communications concurrently with OCB communications. Infrastructure-based communications refer to communications that involve association with the infrastructure unit (e.g., as defined in IEEE 802.11 standards). In addition, infrastructure-based communications between a terminal unit and an infrastructure unit typically involve procedures (e.g., as defined in IEEE 802.11 standards) to establish an authenticated communication link between the terminal unit and the infrastructure unit before data can be exchanged. In contrast, OCB communications do not require association and do not require procedures to establish an authenticated communication link before data exchange between the terminal unit and the infrastructure unit. A terminal unit is not required to be part of a BSS in order to carry out OCB communications. Further, OCB communications occur over an OCB communication link that does not guarantee data security (e.g., no encryption is provided by the OCB communication link), unlike some infrastructure-based communications. Security for OCB communications may be provided using higher layer mechanisms, rather than being provided by the OCB communication link.

FIG. 1 is a block diagram illustrating an example apparatus 100, which may be used to implement the methods and systems disclosed herein. For example, the apparatus 100 may represent an infrastructure unit or a terminal unit. Other apparatuses suitable for implementing the present disclosure may be used, which may include components different from those discussed below. Although FIG. 1 shows a single instance of each component, there may be multiple instances of each component in the apparatus 100.

The apparatus 100 includes at least one processing device 102, such as a processor, a microprocessor, an application-specific integrated circuit (ASIC), a field-programmable gate array (FPGA), a dedicated logic circuitry, or combinations thereof. The apparatus 100 may also include at least one input/output (I/O) interface 104, which may enable interfacing with one or more optional input devices 112 and/or output devices 114. In FIG. 1, the input device(s) 112 (e.g., a keyboard, a mouse, a microphone, a touchscreen, and/or a keypad) and output device(s) 114 (e.g., a display, a speaker and/or a printer) are shown as external to the apparatus 100. In other examples, one or more of the input device(s) 112 and/or the output device(s) 114 may be included as a component of the apparatus 100. In other examples, there may not be any input device(s) 112 and output device(s) 114, in which case the I/O interface 104 may not be needed.

The apparatus 100 includes at least one communications interface 106 supporting at least wireless communications over a wireless link. As will be discussed further below, in the case where the apparatus 100 embodies an infrastructure unit, there may be one or more communications interfaces 106, including at least one communications interface 106 supporting infrastructure-based communications (e.g., cellular communications or BSS communications) and at least one (same or different) communications interface 106 supporting OCB communications. The apparatus 100 includes one or more transceiver antennas 116. The antennas 116 may act together as an antenna array, in which case each antenna 116 may be referred to as an antenna element or radiating element of the antenna array. An antenna array may enable beamforming and beam steering operations by the apparatus 100, in order to carry out directional wireless communications.

The apparatus 100 includes at least one memory 108, which may include a volatile or non-volatile memory (e.g., a flash memory, a random access memory (RAM), and/or a read-only memory (ROM)). The non-transitory memory 108 may store instructions (e.g., in the form of software modules) for execution by the processing device 102, such as to carry out the methods described in the present disclosure. The memory 108 may include other software instructions, such as for implementing an operating system and other applications/functions. In some examples, one or more data sets and/or module(s) may be provided by an external memory (e.g., an external drive in wired or wireless communication with the apparatus 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Figure 2:
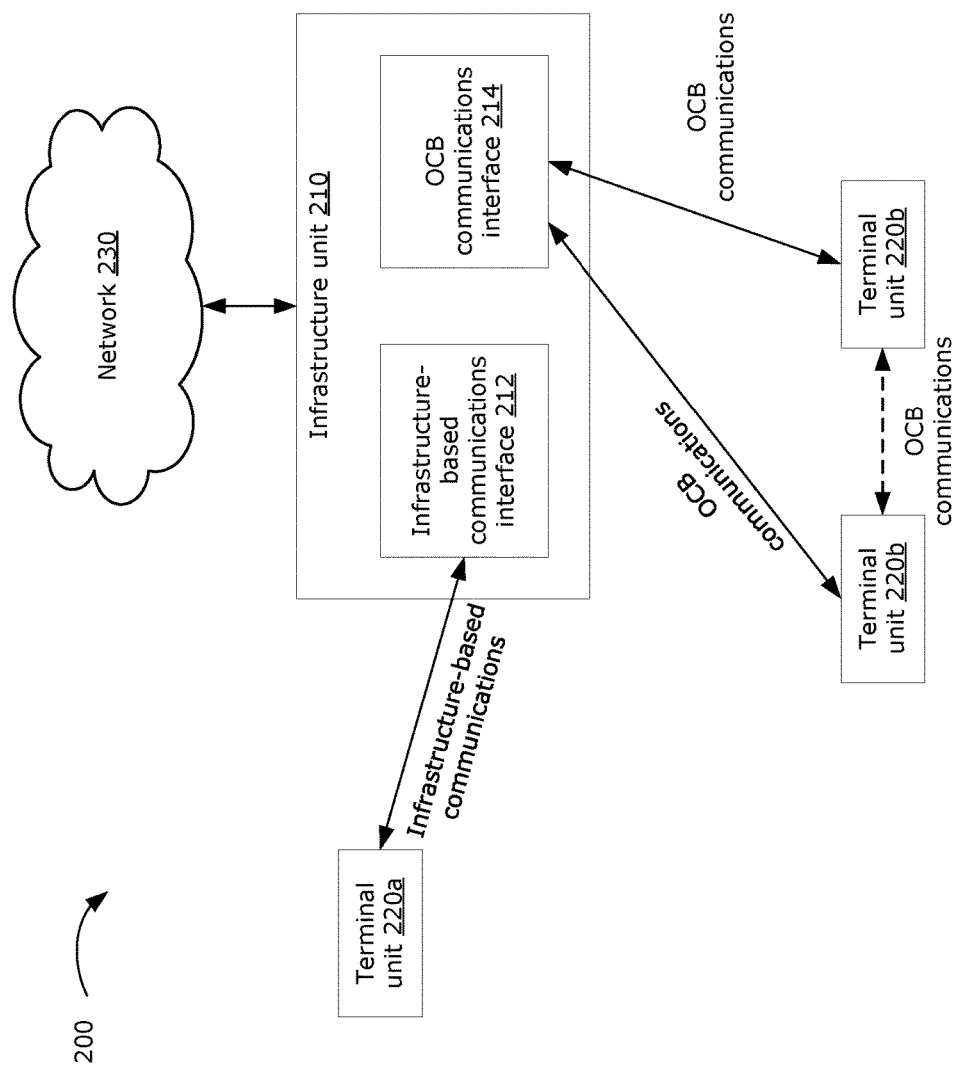
FIG. 2 is a schematic diagram of an example wireless environment, in which methods and apparatuses described herein may be implemented.

FIG. 2 is a schematic diagram of an example wireless environment 200 in which methods and systems described herein may be implemented. The wireless environment 200 shown in FIG. 2 includes an infrastructure unit 210 (e.g., a WLAN AP serving a BSS, or a BS serving a wireless cell) and multiple terminal units 220a, 220b (generally referred to as terminal units 220) within service range of the infrastructure unit 210. The infrastructure unit 210 provides each terminal unit 220 with services, such as access to a network 230 (e.g., a cellular network, an intranet, the Internet, a P2P network, a WLAN, a wide area network (WAN), and/or a Radio Access Network (RAN), among other possibilities). One or more OCB services may be a remote component hosted on the network 230 (e.g., hosted on the Internet, or on a local network). It should be noted that, although OCB services involve communications that are local (e.g., between a terminal unit 220b and the infrastructure unit 210, or between terminal units 220b), a hosted OCB service instance may be a remote component (e.g., hosted on the network 230, rather than locally). Information (e.g., configuration information) about an OCB service on the network 230 may be accessed via the infrastructure unit 210.

In some examples, the terminal units 220 may also be referred to as non-AP STAs, non-AP MLDs or UEs. The terminal units 220 may include one or more terminal units 220a operating in infrastructure mode (also referred to simply as the infrastructure-mode terminal unit(s) 220a) and one or more terminal units 220b operating in OCB mode (also referred to simply as the OCB-mode terminal unit(s) 220b). It should be understood that a terminal unit 220 may be capable of both infrastructure-based communications and OCB communications, and may switch between infrastructure mode and OCB mode. Thus, an infrastructure-mode terminal unit 220a may also operate as an OCB-mode terminal unit 220b (assuming the infrastructure-mode terminal unit 220a is configured to support OCB mode), and vice versa. OCB-mode terminal units 220b may optionally communicate with each other using OCB communications (indicated using dashed line in FIG. 2). OCB communications between two (or more) OCB-mode terminal units 220b may be performed without the infrastructure unit 210 having any role. The infrastructure unit 210 may be used only for service discovery, for example.

The infrastructure unit 210 is capable of concurrently supporting infrastructure-based communications (e.g., BSS communications or cellular communications) as well as OCB communications. Thus, the infrastructure unit 210 is capable of serving the infrastructure-mode terminal unit 220a as well as the OCB-mode terminal units 220b. Although FIG. 2 illustrates a single infrastructure-mode terminal unit 220a and two OCB-mode terminal units 220b, it should be understood that there may be any number of infrastructure-mode terminal units 220a (including none) having an infrastructure-based communication link with the infrastructure unit 210, and there may be any number of OCB-mode terminal units 220b (including none) having an OCB communication link with the infrastructure unit 210. OCB communications may be broadcast or unicast communications. For example, all OCB-mode terminals 220b operating in an OCB service instance may receive OCB service communications.

The infrastructure unit 210 in this example has separate communications interfaces (namely an infrastructure-based communications interface 212 and an OCB communications 214) that support infrastructure-based communication links and OCB communication links, respectively. The communications interfaces 212, 214 may be realized in various ways. For example, the communications interfaces 212, 214 may be separate wireless interfaces (e.g., separate radios) on separate PHY layers that share a single MAC layer. In other examples, the communications interfaces 212, 214 may be replaced by a single wireless interface (e.g., a single radio) that is capable of both infrastructure-based communications (e.g., BSS communications or cellular communications) and OCB communications, and that is controlled to switch or multiplex between infrastructure-based and OCB communications. In other examples, the infrastructure unit 210 may comprise a group of wireless communication devices, with the communications interfaces 212, 214 being provided by separate wireless communication devices (e.g., the infrastructure-based communications interface 212 may be provided by an AP serving an infrastructure BSS or by a BS serving a cell; and the OCB communications interface 214 may be provided by a separate dedicated OCB device). It should be understood that the hardware of the infrastructure unit 210 and the communications interfaces 212, 214 may be realized in various ways, so long as the infrastructure unit 210 supports both infrastructure-based communications (e.g., BSS communications or cellular communications) and OCB communications concurrently.

The wireless environment 200 illustrated in FIG. 2 may represent, for example, a vehicular application where the infrastructure unit 210 is a stationary roadside infrastructure (e.g., a wireless device located at a gas station, a toll booth, a building, a train station, etc.), the infrastructure-mode terminal unit 220a is a relatively stationary vehicle (e.g., a parked car, a train stopped at a station, a slower moving vehicle, etc.) and the OCB-mode terminal units 220b are rapidly moving vehicles (e.g., cars driving by on a road, a train passing through a station, a drone flying past, etc.). The infrastructure unit 210 is capable of concurrently supporting infrastructure-based communications (e.g., BSS communications) with the stationary or slower moving infrastructure-mode terminal unit 220a, and also supporting OCB communications with the more transitory and faster moving OCB-mode terminal units 220b.

In another example, the wireless environment 200 may represent an IoT application in which the infrastructure unit 210 is an IoT gateway. The terminal units 220 may each be IoT devices that use the infrastructure unit 210 as a gateway or relay to the network 230. The infrastructure-mode terminal unit 220a may represent a stationary IoT device (e.g., a fixed structure in a warehouse, such as a shelf or bin), and the OCB-mode terminal units 220b may represent moving IoT devices (e.g., IoT products being moved among the shelves in a warehouse, or autonomous mobile devices (or robots) moving in the warehouse). In a warehouse application, for example, the warehouse may be equipped with a WiFi-enabled infrastructure unit 210 capable of transmitting OCB data frames and that also supports wireless communications (e.g., used by maintenance staff).

Concurrent support of infrastructure-based communications (e.g., BSS communications or cellular communications) and OCB communications, as illustrated in FIG. 2, may be applied in other scenarios, and the present disclosure is not limited to the examples described above.

In the example where the infrastructure-based communications are BSS communications, minimization (or reduction) of co-channel interference between BSS and OCB communications is generally desired. Existing spatial reuse mechanisms, which have been developed for wireless communications under IEEE 802.11ax, may be adapted to support concurrent BSS and OCB communications. For example, the infrastructure unit 210 may determine whether there are adjacent BSSs (e.g., serviced by other infrastructure units, which may or may not support concurrent BSS and OCB communications) based on a received signal strength indicator (RSSI) from an adjacent BSS. If an adjacent BSS is detected, the infrastructure unit 210 may adjust its transmission power to reduce interference.

OCB-mode terminal units 220b may also perform spatial reuse operations (which may be application-controlled operations) for OCB. For example, OCB-mode terminal units 220b may be configured to operate in 20 MHz channels in the unlicensed band when operating in OCB mode. OCB-mode terminal units 220b may also be configured to include an identifier (e.g., a BSS color value or another BSS identifier) in the preamble of all OCB communications, to enable the infrastructure unit 210 to identify the OCB communications as overlapping transmissions that does not belong to the BSS.

Figure 3:
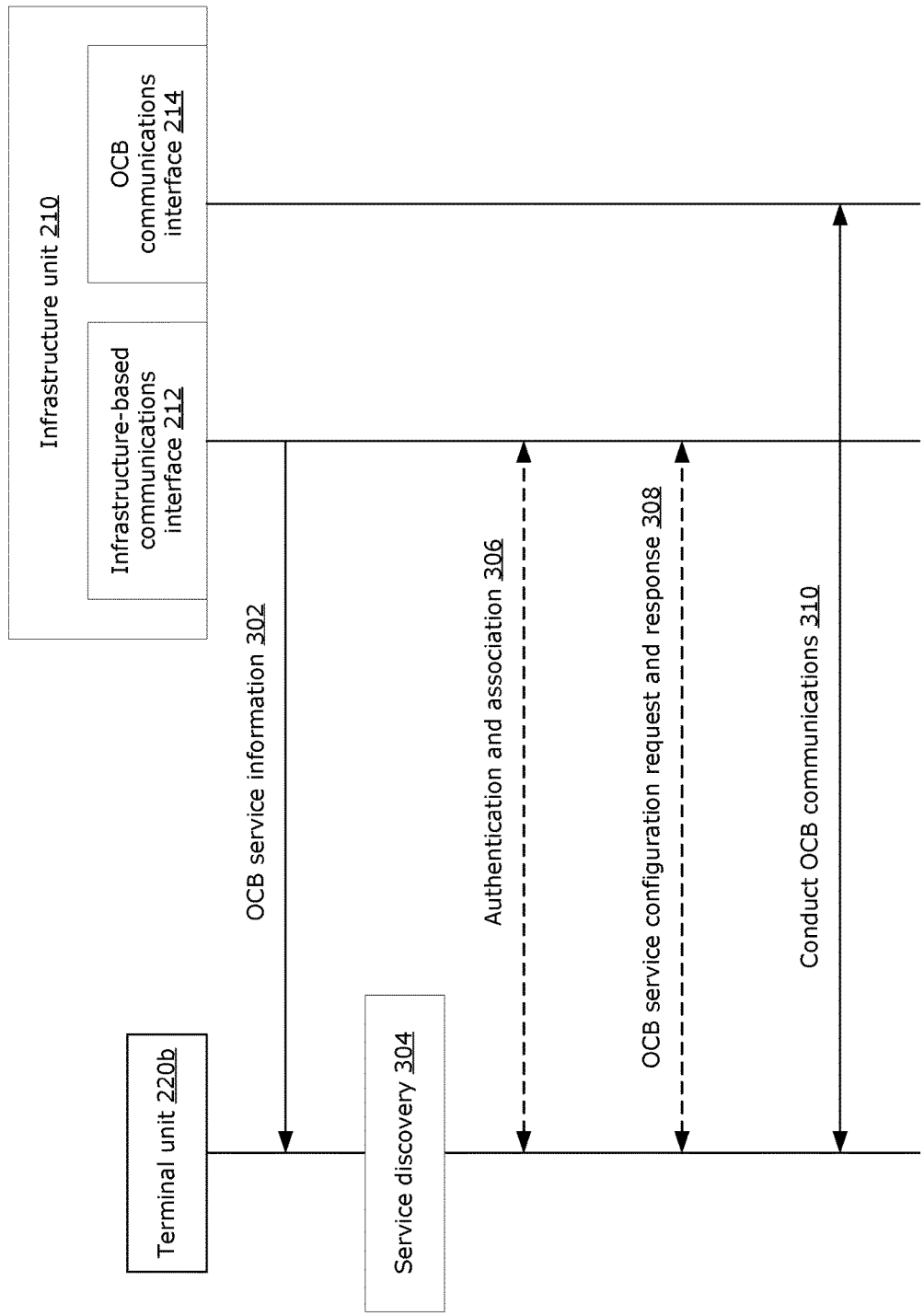
FIG. 3 is a signaling diagram illustrating example communications that may be used to implement example methods for supporting OCB communications concurrently with infrastructure-based communications, as described herein.

FIG. 3 is a signaling diagram illustrating example communications between the infrastructure unit 210 and an OCB-mode terminal unit 220b, to enable the terminal unit 220b to communicate with the infrastructure unit 210 in OCB mode. The infrastructure unit 210 is configured to concurrently support OCB and infrastructure-based communications (e.g., BSS communications). For simplicity, FIG. 3 does not illustrate signaling between the infrastructure unit 210 and the infrastructure-mode terminal unit 220a. Signaling between the infrastructure unit 210 and the infrastructure-mode terminal unit 220a (e.g., signaling for association and authentication) may be performed in accordance with existing standards. Although FIG. 3 illustrates separate infrastructure-based communications interface 212 and OCB communications interface 214 at the infrastructure unit 210, and makes a distinction between communications via the separate interfaces 212, 214, it should be understood that the infrastructure unit 210 may have a single combined communications interface that handles both infrastructure-based and OCB communications.

Prior to the signaling shown in FIG. 3, the OCB-mode terminal unit 220b may be provisioned with an identifier (e.g., a service name or a service hash) identifying the OCB service to be used by the OCB-mode terminal unit 220b. At the start of the signaling, the OCB-mode terminal unit 220b may not have OCB operation enabled, and may perform operations to detect available OCB services (e.g., may perform operations to scan for any nearby infrastructure units that support OCB communications). The infrastructure unit 210 is also provisioned with information about the OCB service (e.g., a service identifier such as a service hash, and information about the operating channel for the OCB service). FIG. 3 may represent communications that takes place when the terminal unit 220b moves into the coverage area of the infrastructure unit 210.

The infrastructure unit 210 advertises (e.g., via broadcast) OCB service information in a transmission at 302. Although a single transmission is shown, it should be understood that the OCB service information may be advertised repeatedly (e.g., in periodic transmissions). The OCB service information is advertised in a transmission from the infrastructure-based communications interface 212. For example, the infrastructure unit 210 may broadcast a beacon frame or a system information block (SIB) containing the OCB service information. In some examples, the transmission at 302 may be intended for the OCB-mode terminal unit 220b (e.g., may be transmitted in a unicast or multicast, rather than a broadcast). For example, the infrastructure unit 210 may transmit the OCB service information in a dedicated (or UE-specific) signal to the OCB-mode terminal unit 220b, such as using radio resource control (RRC) signaling. In another example, the infrastructure unit 210 may transmit the OCB service information in a probe response, or using any suitable query and response protocol (e.g., using the access network query protocol (ANQP)). The infrastructure unit 210 may advertise the OCB service information unilaterally (e.g., broadcasted at regular intervals), or may advertise the OCB service information in response to a probe request or query (e.g., from the terminal unit 220b), or both.

The OCB service information includes an identifier (e.g., a service hash) of the advertised OCB service and information about the channel (and optionally information about the operating class) used by the OCB service. In some examples, multiple OCB services may be advertised (e.g., if there are multiple OCB services operating in the area), and the OCB service information may include a service identifier and information about the channel (and operating class if applicable) for each of the advertised OCB services. For example, the OCB service information may be provided in an information element (IE), such as the IE disclosed herein.

The OCB-mode terminal unit 220b, when it is in the coverage area of the infrastructure unit 210 may perform operations at 304 to discover available services. The OCB-mode terminal unit 220b detects the advertised OCB service information and uses the OCB service information (e.g., the service hash) to discover the infrastructure unit 210, including the operating class and channel used by the OCB service. It should be noted that, in communications on unlicensed bands, there can be multiple different services provided. Therefore, the service identifier (e.g., service hash) provides information to enable the OCB-mode terminal unit 220b to determine if the infrastructure unit 210 provides the OCB service required (or requested) by the OCB-mode terminal unit 220b. For example, the OCB-mode terminal unit 220b may compare the advertised service hash with the service hash provisioned at the OCB-mode terminal unit 220b (or the OCB-mode terminal unit 220b may generate the service hash from the service name provisioned at the OCB-mode terminal unit 220b), to determine if there is a match.

In some examples, there may be local OCB service-specific configuration required to operate the OCB service. The OCB-mode terminal unit 220b may not have been provisioned with the required configuration information beforehand. Thus, optionally, if the OCB-mode terminal unit 220b is also capable of operating in infrastructure mode (e.g., capable of BSS communications or cellular communications), the OCB-mode terminal unit 220b may temporarily establish an infrastructure-based communication link with the infrastructure unit 210 (e.g., via the infrastructure-based communications interface 212) to obtain the configuration information.

The OCB-mode terminal unit 220b may, at 306, perform operations (e.g., as defined in existing IEEE 802.11 standards) to discover the location of the infrastructure unit and to associate with the infrastructure unit (e.g., including association and authentication procedures via the infrastructure-based communications interface 212). The infrastructure-based communication link may support higher throughput than an OCB communication link, and may enable the OCB-mode terminal unit 220b to quickly obtain larger amounts of data from the infrastructure unit 210 than would be supported by an OCB communication link.

At 308, the OCB-mode terminal unit 220b may communicate with the infrastructure unit 210 (e.g., via the infrastructure-based communications interface 212) to obtain more information about the advertised OCB service (e.g., to obtain configuration information, such as an URL address for the service). For example, the OCB-mode terminal unit 220b may connect to the OCB service (e.g., hosted on the Internet or other network, not shown in FIG. 3), via the infrastructure unit 210, to request configuration information and to receive a response including the configuration information for the OCB service.

It should be noted that the infrastructure-based communication link may be temporary and short-lived (e.g., lasting from about a few 100 ms to a few seconds). After the necessary information has been obtained, the infrastructure-based communication link may be disconnected.

After performing discovery 304 (and optionally obtaining configuration information via optional communications 306 and 308), the OCB-mode terminal unit 220b determines that the advertised OCB service matches the OCB service required (or requested) by the OCB-mode terminal unit 220b. The OCB-mode terminal unit 220b may configure itself in accordance with configuration information for the OCB service. The OCB-mode terminal unit 220b then conducts OCB communications with the infrastructure unit 210 (e.g., via the OCB communications interface 214) at 310, using the operating channel indicated in the OCB service information.

In some examples, an advertisement is transmitted from the infrastructure unit 210 (e.g., via the OCB communications interface 214) as part of the OCB communications at 310. The transmitted advertisement may contain information indicating that the infrastructure unit 210 also supports an infrastructure-based communication link. For example, such an advertisement may be a WAVE frame extension as defined in IEEE 1609 standards. By advertising this information in the OCB communications 310, the OCB-mode terminal unit 220b may have information to enable the OCB-mode terminal unit 220b to communicate with the infrastructure unit 210 using an infrastructure-based communication link (e.g., by switching to infrastructure mode).

The OCB communications link may be relatively short-lived (e.g., lasting from about a few 100 ms to a few seconds), and may be automatically disconnected when the terminal unit 220b moves outside the coverage area of the infrastructure unit 210. For example, in some unlicensed bands, the OCB-mode terminal unit 220b may periodically listen for signals broadcasted by the infrastructure unit 210 and if the expected signal is not found, the terminal unit 220b may discontinue OCB communications.

It should be noted that the signaling illustrated in FIG. 3 may be performed in the context of OCB communications concurrent with various types of infrastructure-based communications (such as cellular communications or BSS communications) at the infrastructure unit 210. Additional details specific to concurrent OCB and cellular communications will be discussed further below.

The communications illustrated in FIG. 3 may be used, for example, in a train signaling application. For example, the infrastructure unit 210 may implemented as part of a train station (or other stationary structure at a train station). A rail service may provide a diagnostic service at the infrastructure unit 210, using OCB communications. Different OCB operation information (e.g., different service hash and/or different operating channel information) may be provisioned at different train stations. The OCB-mode terminal unit 220b may be implemented as part of a rail car (e.g., as a wireless module, which may also be capable of WLAN communications). The infrastructure unit 210 advertises its OCB service (e.g., by broadcasting the OCB service information at regular intervals, or when an approaching train is detected). When the rail car approaches the train station, the OCB-mode terminal unit 220b discovers the advertised OCB service (e.g., using the broadcasted OCB service information to determine the operating parameters for the OCB service). The OCB-mode terminal unit 220b may then use OCB communications with the infrastructure unit 210 to access the diagnostic service provided in the area.

As previously noted, the OCB service information may be advertised in an IE. FIGS. 4 and 5 illustrate example formats for an OCB operation IE, as disclosed herein.

Figure 4A:
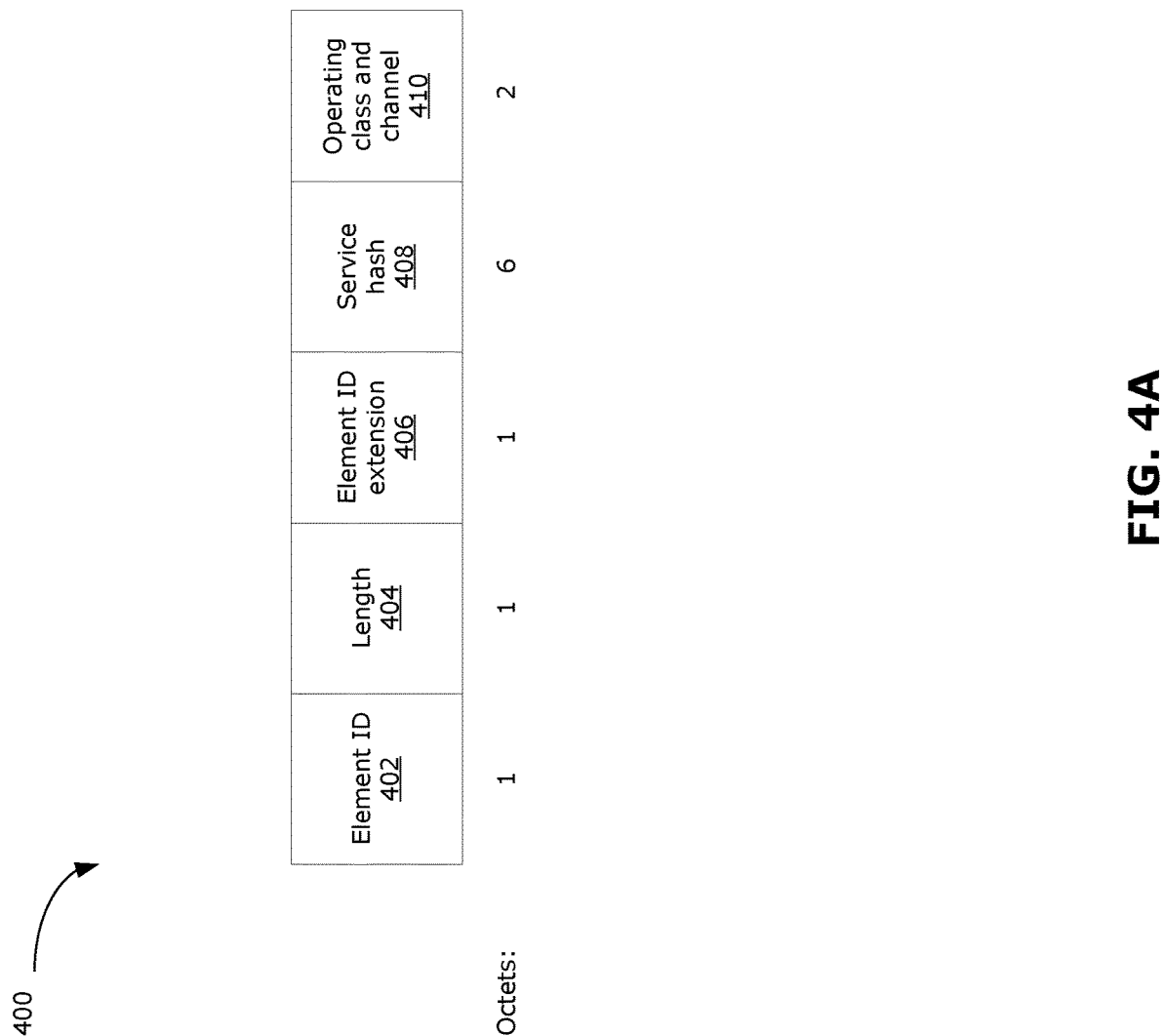
FIGS. 4A, 4B, 5A and 5B illustrate example formats for an OCB operation information element, in accordance with examples disclosed herein.

FIG. 4A illustrates an example format for an OCB operation IE 400, which may be used to advertise OCB service information for a single OCB service (e.g., in the transmission at 302 of FIG. 3).

The OCB operation IE 400 includes an element ID field 402, followed by a length field 404 and an optional element ID extension field 406. The element ID field 402, length field 404 and element ID extension field 406 are each one octet long, and may be defined in accordance with IEEE 802.11-2020. The element ID field 402 identifies the type of IE, and contains a standard-defined identifier for the OCB operation IE 400. The length field 404 indicates the number of octets in the OCB operation IE 400 (excluding the element ID field 402 and the length field 404). The element ID extension field 406 is optional, and is present only if there is a standard-defined value for this field.

The OCB operation IE 400 includes a service hash field 408, which is six octets long, following the optional element ID extension field 406. The service hash field 408 may be defined in accordance with IEEE 802.11-2020 (particularly in IEEE 802.11aq). The service hash field 408 contains a hash value that is generated from a service name, to uniquely identify the advertised OCB service. For example, as defined in IEEE 802.11-2020, each service is associated with a unique service name that is an alphanumeric string. A defined hash function is used to generate a six-octet long hash value that is unique to the service. This hash value is referred to as the service hash. The hash value contained in the service hash field 408 provides information to enable an OCB-mode terminal unit 220b to discover the OCB service available at an infrastructure unit 210 and determine whether the advertised OCB service matches the service provisioned at the OCB-mode terminal unit 220b.

The OCB operation IE 400 includes an operating class and channel field 410, which may be two octets long, following the service hash field 408. The operating class and channel field 410 may be defined in accordance with IEEE 802.11-2020. The operating class and channel field 410 may include, for example, a first one-octet subfield containing an operating class value, and a second one-octet subfield containing a channel value. The operating class subfield indicates an operating class value (which may be defined by a standard). The operating class value may provide information to determine, for example, the power and application type for using the OCB service. The channel subfield indicates a channel number (which may be defined by a standard). The channel number may be interpreted in the context of the indicated operating class. The operating class value and channel value contained in the operating class and channel field 410 provide information to enable the OCB-mode terminal unit 220b to determine the channel and channel width (and possible the power and application type) to use for accessing the advertised OCB service via the infrastructure unit 210.

In some examples, the operating class and channel field 410 may be extended (e.g., longer than two octets) to include information about the coverage area for which the channel class information is valid. The IEEE 802.11-2020 standard defines possible shapes for the coverage area, and information about the shape of the coverage area in which the channel class information applies may be indicated in the operating class and channel field 410. This information may be used by the OCB-mode terminal unit 220b, together with information of its own position, to determine whether it is inside or outside of the coverage area in which the channel class information is valid. For example, this information may enable the OCB-mode terminal unit 220b to comply with radio regulations governing communications on different channel classes.

Figure 4B:
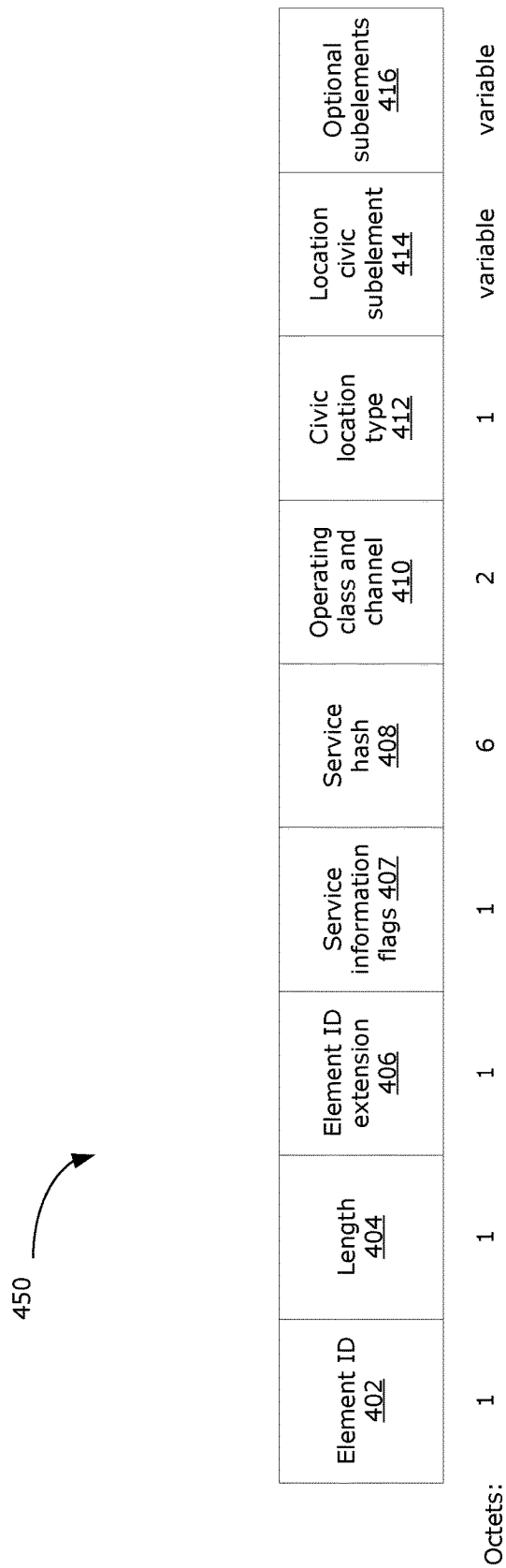

FIG. 4B illustrates another example format for an OCB operation IE 450, which may be used to advertise OCB service information for a single OCB service (e.g., in the transmission at 302 of FIG. 3).

The OCB operation IE 450 includes the fields 402, 404, 406, 408, 410 of the OCB operation IE 400 described above, and details of the fields 402, 404, 406, 408, 410 need not be repeated here. In addition, the OCB operation IE 450 includes a service information flags field 407, a civic location type field 412, a location civic subelement field 414, and an optional subelements field 416.

The service information flags field 407 is an 8-bit field, with the first bit being the location available field (which is a binary flag). If the location available field is set to 1, this indicates that location elements (i.e., the fields 412, 414 and optional field 416) are included for the indicated OCB service; otherwise, the location available field is set to 0 and the civic location type field 412, location civic subelement field 414, and optional subelements field 416 may be omitted.

The civic location type field 412, location civic subelement field 414 and optional subelements field 416 are location elements that may be defined in accordance with IEEE 802.11-2020 standard, with octet length as shown in FIG. 4B. The fields 412, 414 and 416 provide information indicating a coverage area where the OCB service is operational. It should be noted that the civic location type field 412, location civic subelement field 414 and optional subelements field 416 may not be present in the OCB operation IE 450 (e.g., if there is no explicitly defined coverage area for the OCB service).

Figure 5A:
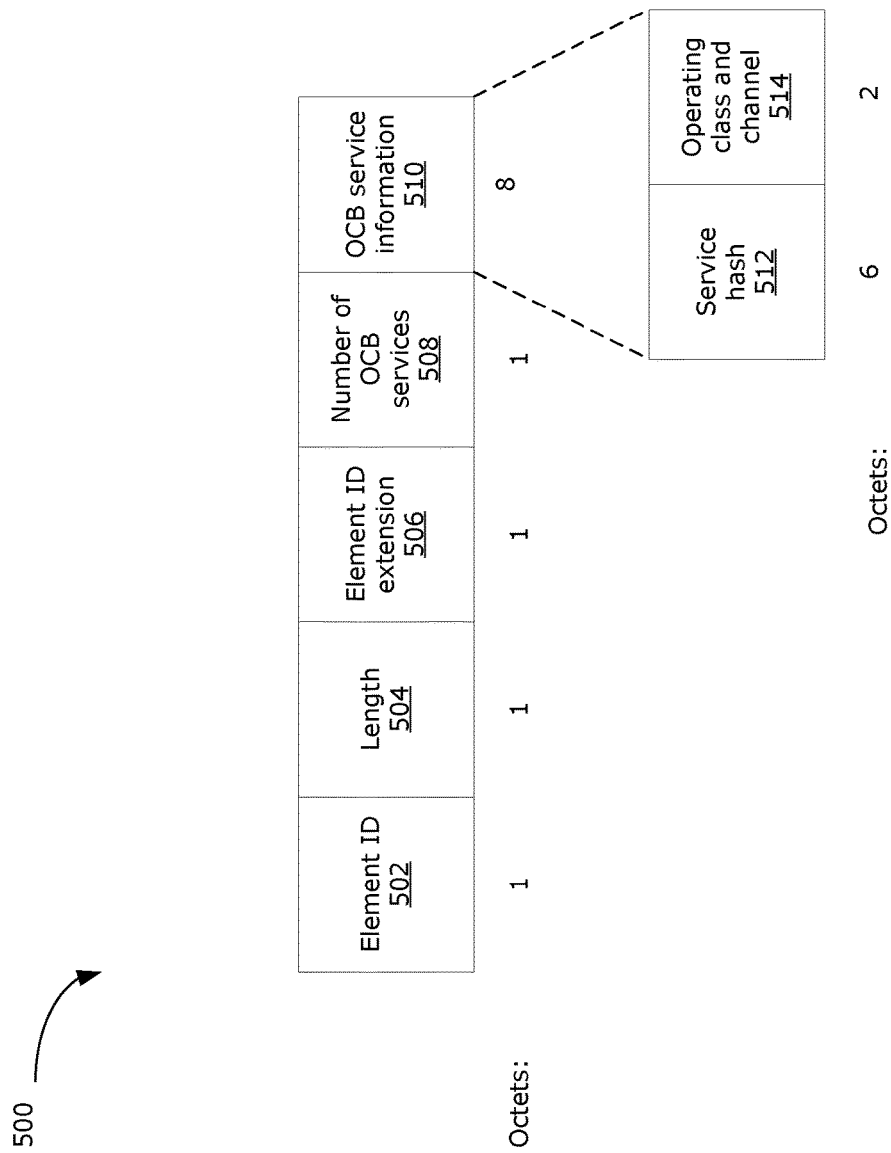

FIG. 5A illustrates an example format for another OCB operation IE 500, which may be used to advertise OCB service information for multiple OCB services (e.g., in the transmission at 302 of FIG. 3).

The OCB operation IE 500 includes an element ID field 502, a length field 504 and an optional element ID extension field 506. The fields 502, 504 and 506 are similar to the previously-described fields 402, 404 and 406, respectively, and need not be described again in detail. The OCB operation IE 500 includes a number of OCB services field 508, which is one octet long. The value contained in the number of OCB services field 508 indicates a count of the OCB services advertised in the OCB operation IE 500. It should be noted that the number of OCB services field 508 may indicate one OCB service is advertised. Thus, the OCB operation IE 500 may be used to advertise a single OCB service, as well as multiple OCB services.

The OCB operation IE 500 includes one or more OCB service information fields 510, each corresponding to a respective advertised OCB service. FIG. 5 illustrates a single instance of the OCB service information field 510 for simplicity, however it should be understood that the number of OCB service information fields 510 included in the OCB operation IE 500 may be equivalent to the number of OCB services advertised. Thus, the total length of the OCB operation IE 500 may be variable. Each instance of the OCB service information field 510 includes a service hash subfield 512 and an operating class and channel subfield 514, which may have a length of 8 octets, for example. The service hash subfield 512 and the operating class and channel subfield 514 are similar to the previously-described service hash field 408 and the operating class and channel field 410, respectively, and need not be described again in detail.

Figure 5B:
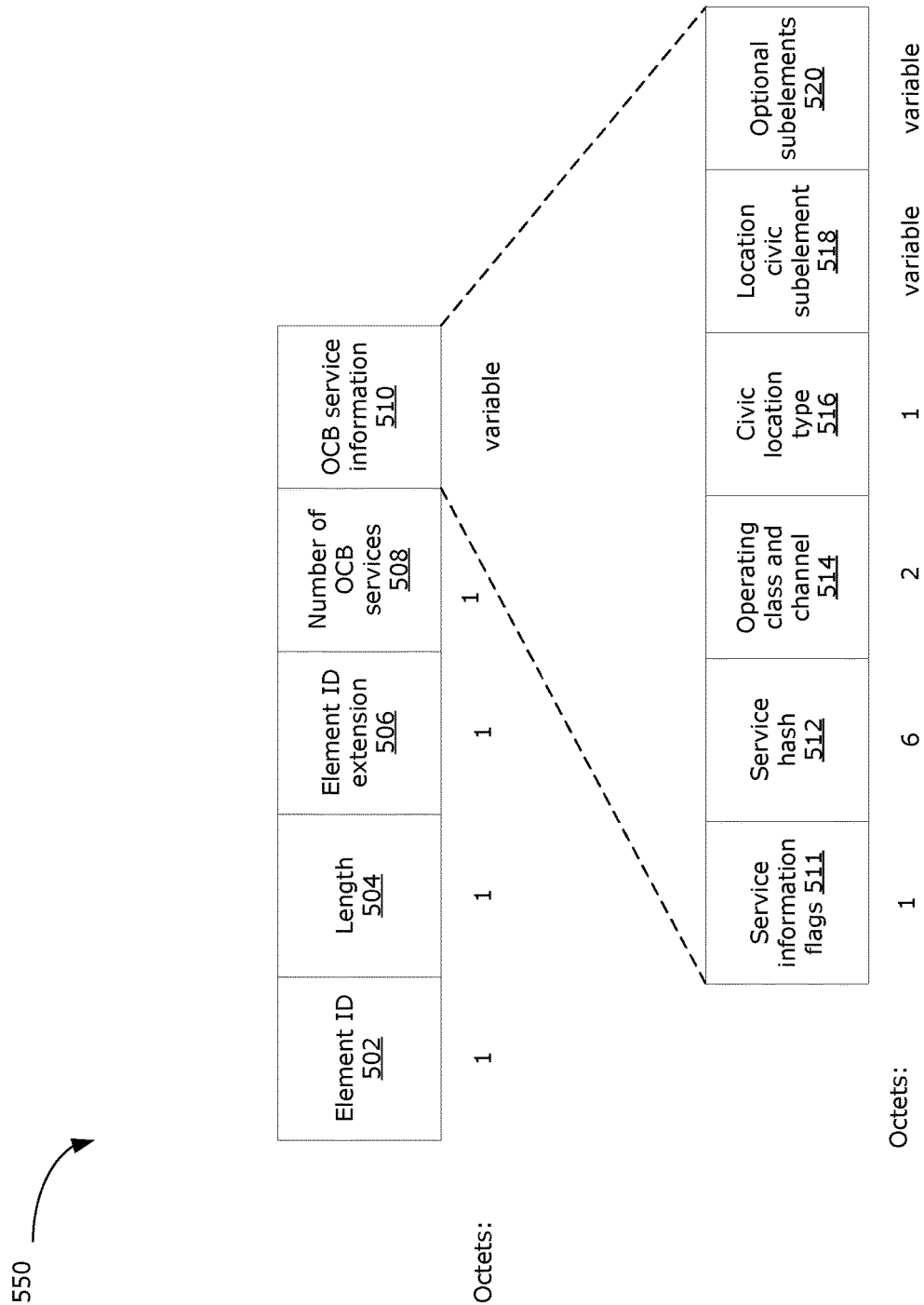

FIG. 5B illustrates another example format for an OCB operation IE 550, which may be used to advertise OCB service information for multiple OCB services (e.g., in the transmission at 302 of FIG. 3).

The OCB operation IE 550 includes the fields 502, 504, 506, 508, 510 and subfields 512, 514 of the OCB operation IE 500 described above, and details of the fields 502, 504, 506, 508, 510 and subfields 512, 514 need not be repeated here. However, the OCB service information field 510 may have variable length. In addition, the OCB operation IE 550 includes, in the OCB service information field 510, a service information flags subfield 511, a civic location type subfield 516, a location civic subelement subfield 518, and an optional subelements subfield 520.

The service information flags subfield 511 is similar to the service information flags field 407 previously described, and need not be discussed again in detail. The civic location type subfield 516, location civic subelement subfield 518 and optional subelements subfield 520 are also similar, respectively, to the civic location type field 412, location civic subelement field 414 and optional subelements field 416 that have been previously described, and need not be discussed again in detail. It should be noted that the civic location type subfield 516, location civic subelement subfield 518 and optional subelements subfield 520 may or may not be present for each instance of the OCB service information field 510, depending on whether there is a defined coverage area for the corresponding OCB service.

It should be noted that, although some fields of the OCB operation IE 400, 450, 500, 550 may be defined in existing standards, the inclusion of the service hash field 408 (or subfield 512) and the operating class and channel field 410 (or subfield 514) together in a single IE may not be defined in any existing standard. The OCB operation IE 400, 450, 500, 550 disclosed herein may enable an infrastructure unit 210 to advertise the OCB service(s) available in the area, concurrently with supporting infrastructure-based communications (e.g., BSS communications or cellular communications).

The present disclosure provides systems and methods that enable an infrastructure unit to concurrently support infrastructure-based communications and OCB communications. The infrastructure-based communications that is supported concurrent with OCB communications may be any infrastructure-based communications that involve established communications links (e.g., requiring association between a terminal unit and an infrastructure unit and/or requiring an established communication link), including BSS communications and cellular communications, among other possibilities.

The communications between the OCB-mode terminal unit 220b and the infrastructure unit 210 may be adapted in the case where the concurrent infrastructure-based communication is cellular communication. For example, instead of advertising the OCB service information via BSS communications (e.g., via beacon frames and probe responses), the infrastructure unit 210 may advertise the available OCB service via cellular communications (e.g., broadcast via a SIB as defined in 3GPP wireless technology). The OCB-mode terminal unit 220b may occasionally (e.g., at regular periods) connect to the cellular infrastructure (e.g., establish a temporary cellular communication link with the infrastructure unit 210) to obtain OCB service information from the infrastructure unit 210. The OCB-mode terminal unit 220b may establish a temporary cellular communication link using any suitable mechanism, for example using a low power cellular technology such as narrowband-IoT (NB-IoT) or category M1 (Cat-M1) in the case where the OCB-mode terminal unit 220b is an IoT device.

In another example, the infrastructure unit 210 may be a cellular BS (e.g., an eNB or gNB), and may advertise its OCB service over a component carrier (CC) in the licensed band. This may ensure the OCB service information is broadcasted to a wide area, which may be useful where OCB-mode terminal units 220b have high mobility (e.g., are vehicular devices).

An OCB-mode terminal unit 220b may, for example, receive broadcasted information about the OCB service when the OCB-mode terminal unit 220b is in an idle state or inactive state, for example the IDLE or INACTIVE state as defined in 5G New Radio (NR) standards. As defined in standards, when a terminal unit 220 is in the IDLE or INACTIVE state, the terminal unit 220 is not communicating unicast data with the infrastructure unit 210 (e.g., a base station), in order to save power; however the terminal unit 220 is monitoring for paging messages. From the paging messages, the terminal unit 220 can acquire system information (SI) and can perform measurements of neighboring cells for cell selection (or reselection). An OCB-mode terminal unit 220b that is in the idle or inactive state may receive information about the OCB service via a remaining minimum system information (RMSI) signal, for example in a SIB such as SIB1 or a subsequent SIB, broadcasted by the infrastructure unit 210.

An OCB-mode terminal unit 220b may additionally or alternatively receive information about the OCB service when the OCB-mode terminal unit 220b is in the RRC_CONNECTED state as defined in 5G NR standards. When the OCB-mode terminal unit 220b is in the RRC_CONNECTED state, the OCB-mode terminal unit 220b is capable of receiving radio resource control (RRC) signaling from the infrastructure unit (e.g., the serving eNB or gNB of a cell). The infrastructure unit 210 may transmit the OCB service information specifically to a target OCB-mode terminal unit 220b using a dedicated (e.g., UE-specific) IE that is signaled to the target OCB-mode terminal unit 220b in a RRC signal.

Figure 6A:
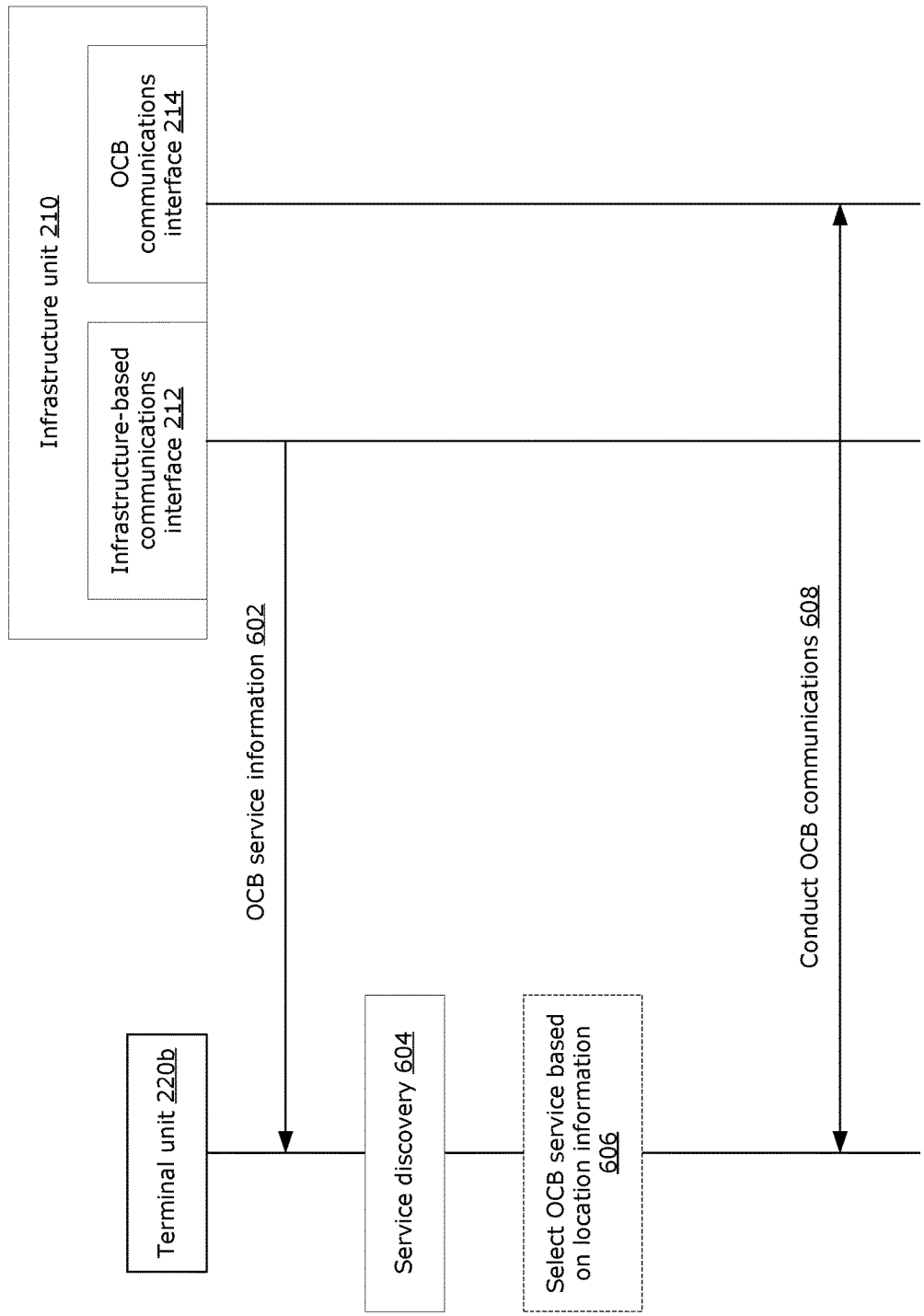
FIGS. 6A-6C are signaling diagrams illustrating communications that may be used to implement example methods for supporting OCB communications concurrently with cellular communications, as described herein.
Figure 6B:
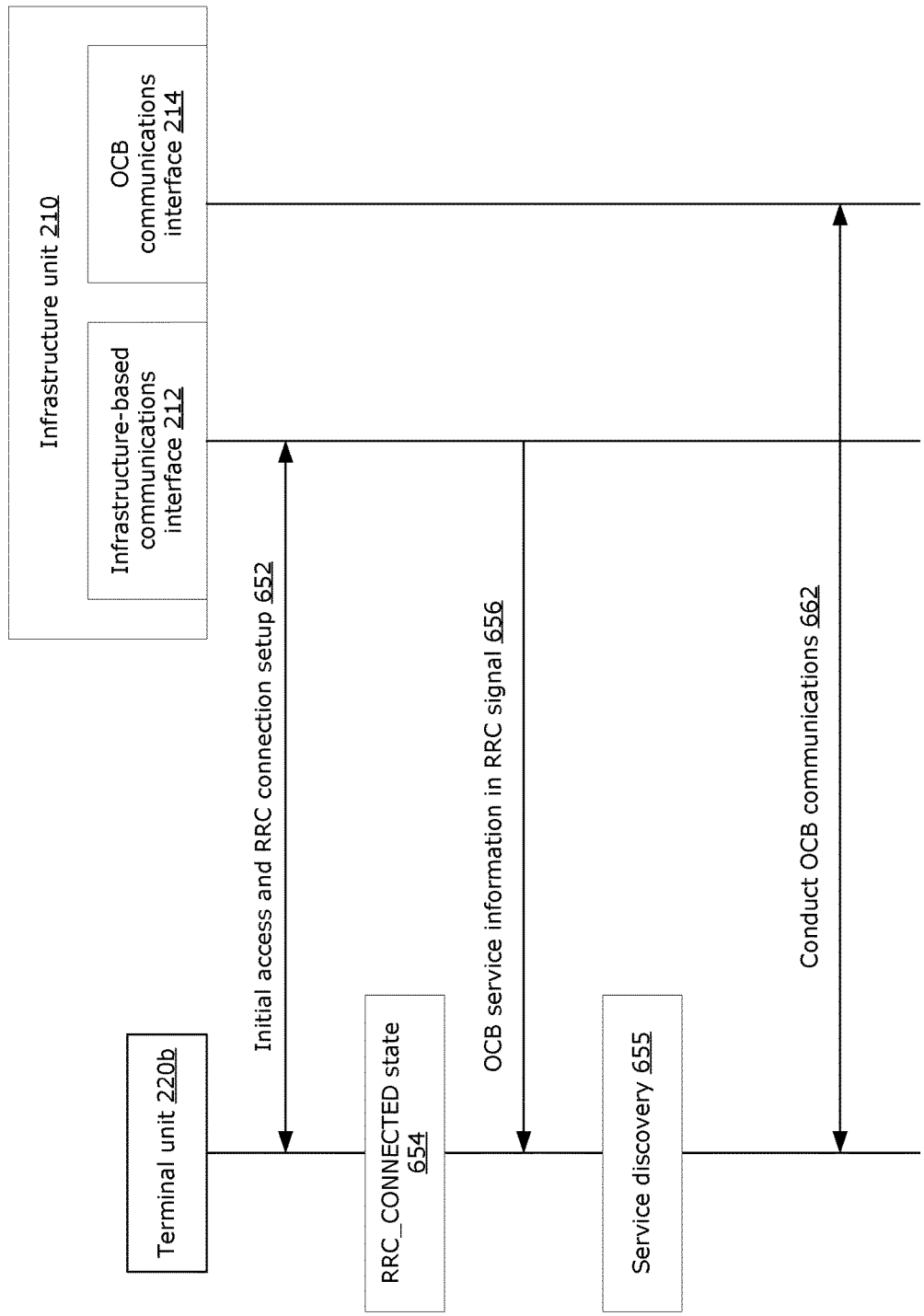
Figure 6C:
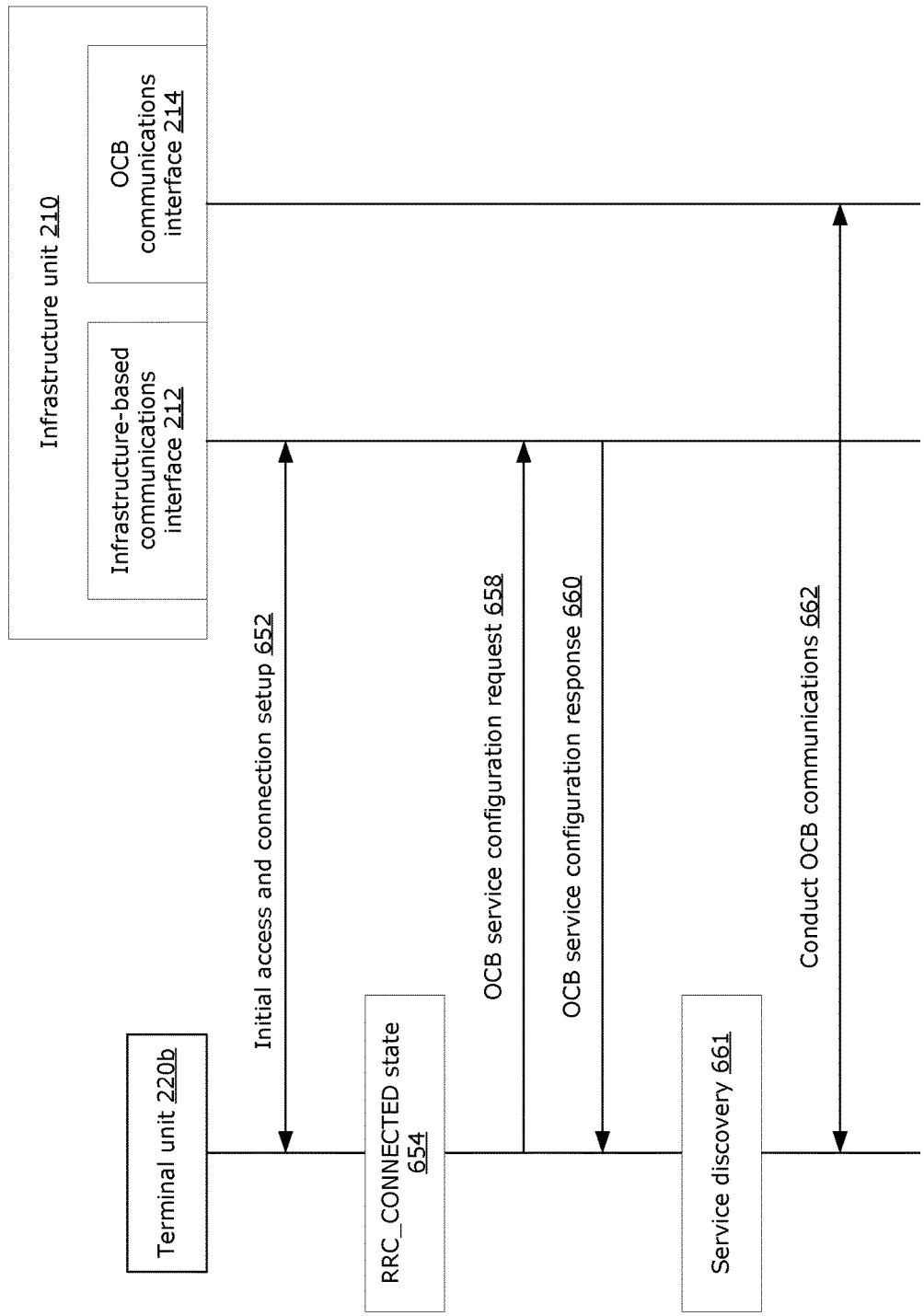

As previously mentioned, the signaling illustrated in FIG. 3 may be used to support concurrent cellular and OCB communications. FIGS. 6A-6C illustrate details of the signaling that may be specific to concurrent cellular and OCB communications, as discussed above. The signaling illustrated in FIGS. 6A-6C may be generally encompassed by the signaling illustrated in FIG. 3, however FIGS. 6A-6C are presented to illustrate some details specifically in the context of concurrently supported cellular and OCB communications.

FIG. 6A is a signaling diagram illustrating example communications between the infrastructure unit 210 and an OCB-mode terminal unit 220b, in which the infrastructure unit 210 supports cellular communications concurrently with OCB communications. In this example, the infrastructure-based communications interface 212 may be implemented as a BS (e.g., an eNB or gNB) as part of the infrastructure unit 210. The infrastructure unit 210 has been provisioned with OCB service information (e.g., service hash and operating channel). The OCB-mode terminal unit 220b is configured to support OCB communications, and is also capable of cellular communications. FIG. 6A may represent communications that takes place when the OCB-mode terminal unit 220b moves into the coverage area of the infrastructure unit 210.

Prior to the signaling shown in FIG. 6A, the OCB-mode terminal unit 220b in this example is in the IDLE/INACTIVE state. The OCB-mode terminal unit 220b may be provisioned with an identifier (e.g., a service name or a service hash) identifying the OCB service to be used by the OCB-mode terminal unit 220b. At the start of the signaling, the OCB-mode terminal unit 220b may not have OCB operation enabled, and may perform operations to detect available OCB services (e.g., may perform operations to scan for any nearby infrastructure units that support OCB communications). For example, the terminal unit 220b, while in the IDLE/INACTIVE state, may be configured to periodically connect to the cellular network (e.g., periodically connect to any nearby infrastructure unit 210) to scan for nearby OCB services. The periodic transmissions from the OCB-mode terminal unit 220b may enable the infrastructure unit 210 to determine the location of the OCB-mode terminal unit 220b (e.g., using a positioning method based on uplink signal measurements and/or downlink signal measurements provided by the OCB-mode terminal unit 220b). By determining the location of the OCB-mode terminal unit 220b, the infrastructure unit 210 may be able to determine whether to provide OCB service to the OCB-mode terminal unit 220b.

The infrastructure unit 210 advertises OCB service information in a transmission at 602, from the infrastructure-based communications interface 212. In this example, OCB service information may be advertised through common signaling in a RMSI on a licensed cell. Although a single transmission is shown, it should be understood that the OCB service information may be advertised repeatedly (e.g., in periodic transmissions).

The OCB service information includes an identifier (e.g., a service hash) of the advertised OCB service and may also include OCB parameters such as information about the channel (and optionally information about the operating class) used by the OCB service. In some examples, multiple OCB services may be advertised (e.g., if there are multiple OCB services operating in the area), and the OCB service information may include service information and parameters for each of the advertised OCB services.

The OCB-mode terminal unit 220b, when it is in the coverage area of the infrastructure unit 210 may perform operations at 604 to discover available services. In this example, the OCB-mode terminal unit 220b, while in the IDLE/INACTIVE state, detects the advertised OCB service information (e.g., in the signaled RMSI) and uses the OCB service information (e.g., the service hash) to discover the infrastructure unit 210, including the operating class and channel used by the OCB service.

Optionally, if the OCB-mode terminal unit 220b detects multiple OCB services (e.g., the OCB-mode terminal unit 220b is within coverage of multiple infrastructure units 210 with available OCB services), the OCB-mode terminal unit 220b may, at 606, select which OCB service to use based on location information. For example, the OCB-mode terminal unit 220b may perform measurement of downlink signals (e.g., the signal transmitted at 602, or other periodic positioning signal transmitted by the infrastructure unit 210) received from the infrastructure unit 210 and/or may perform measurement of positioning signals (e.g., assisted global navigation satellite system (A-GNSS) signals) from the infrastructure unit 210 to determine the location of the infrastructure unit 210. The OCB-mode terminal unit 220b may then select the OCB service available at the nearest infrastructure unit 210.

After performing discovery 604 (and optionally selecting the OCB service based on location information at 606), the OCB-mode terminal unit 220b determines that the advertised OCB service matches the OCB service required (or requested) by the OCB-mode terminal unit 220b. The OCB-mode terminal unit 220b may configure itself in accordance with configuration information in the OCB service information (e.g., configure itself to use the operating parameters indicated in the OCB service information). The OCB-mode terminal unit 220b then conducts OCB communications with the infrastructure unit 210 (e.g., via the OCB communications interface 214) at 608, using the parameters (e.g., operating channel) indicated in the OCB service information.

FIG. 6B is a signaling diagram illustrating another set of example communications between the infrastructure unit 210 and an OCB-mode terminal unit 220b, in which the infrastructure unit 210 supports cellular communications concurrently with OCB communications. The signaling illustrated in FIG. 6B may enable OCB service discovery by the OCB-mode terminal unit 220b when the OCB-mode terminal unit 220b is in a RRC_CONNECTED state, as discussed below. The infrastructure unit 210 has been provisioned with OCB service information (e.g., service hash and operating channel). The OCB-mode terminal unit 220b is configured to support OCB communications, and is also capable of cellular communications. FIG. 6B may represent communications that takes place when the OCB-mode terminal unit 220b moves into the coverage area of the infrastructure unit 210.

Similar to the example of FIG. 6A, prior to the signaling shown in FIG. 6B, the OCB-mode terminal unit 220b may be in an IDLE/INACTIVE state. The OCB-mode terminal unit 220b may be provisioned with an identifier (e.g., a service name or a service hash) identifying the OCB service to be used by the OCB-mode terminal unit 220b. At the start of the signaling, the OCB-mode terminal unit 220b may not have OCB operation enabled, and may perform operations to detect available OCB services (e.g., may perform operations to scan for any nearby infrastructure units that support OCB communications). For example, the OCB-mode terminal unit 220b, while in the IDLE/INACTIVE state, may be configured to periodically connect to the cellular network (e.g., periodically connect to any nearby infrastructure unit 210) to scan for nearby OCB services.

When the OCB-mode terminal unit 220b enters the coverage area of the infrastructure unit 210, the OCB-mode terminal unit 220b and the infrastructure unit (via the infrastructure-based communications interface 212) may, at 652, perform initial access and RRC connection setup procedures on a licensed serving cell (e.g., in accordance with procedures defined in IEEE 802.11 standards). After successfully establishing a RRC connection, the OCB-mode terminal unit 220b is in the RRC_CONNECTED state at 654.

At 656, the OCB-mode terminal unit 220b receives dedicated signaling of OCB service information (e.g., including a service identifier and channel information, or other parameters) in a RRC signal from the infrastructure unit (via the infrastructure-based communications interface 212) at 656. For example, the OCB service information may be provided in a dedicated information element.

The OCB-mode terminal unit 220b uses the OCB service information to perform service discovery at 655, and determines that the advertised OCB service matches the OCB service required (or requested) by the OCB-mode terminal unit 220b. The OCB-mode terminal unit 220b may configure itself in accordance with configuration information in the OCB service information (e.g., configure itself to use the operating parameters indicated in the OCB service information). The OCB-mode terminal unit 220b then conducts OCB communications with the infrastructure unit 210 (e.g., via the OCB communications interface 214) at 662, using the parameters indicated in the OCB service information.

FIG. 6C is a signaling diagram illustrating another set of example communications between the infrastructure unit 210 and an OCB-mode terminal unit 220b, in which the infrastructure unit 210 supports cellular communications concurrently with OCB communications. The signaling illustrated in FIG. 6C is similar to the signaling of FIG. 6C, and signals in FIG. 6C that have been described in FIG. 6B need not be discussed in detail again.

Similar to the example of FIG. 6B, the infrastructure unit 210 has been provisioned with OCB service information (e.g., service hash and operating channel). The OCB-mode terminal unit 220b is configured to support OCB communications, and is also capable of cellular communications. FIG. 6C may represent communications that takes place when the OCB-mode terminal unit 220b moves into the coverage area of the infrastructure unit 210. Prior to the signaling shown in FIG. 6C, the OCB-mode terminal unit 220b may be in an IDLE/INACTIVE state. The OCB-mode terminal unit 220b may be provisioned with an identifier (e.g., a service name or a service hash) identifying the OCB service to be used by the OCB-mode terminal unit 220b. At the start of the signaling, the OCB-mode terminal unit 220b may not have OCB operation enabled, and may perform operations to detect available OCB services (e.g., may perform operations to scan for any nearby infrastructure units that support OCB communications). For example, the OCB-mode terminal unit 220b, while in the IDLE/INACTIVE state, may be configured to periodically connect to the cellular network (e.g., periodically connect to any nearby infrastructure unit 210) to scan for nearby OCB services.

When the OCB-mode terminal unit 220b enters the coverage area of the infrastructure unit 210, the OCB-mode terminal unit 220b and the infrastructure unit (via the infrastructure-based communications interface 212) may, at 652, perform initial access and RRC connection setup procedures on a licensed serving cell (e.g., in accordance with procedures defined in IEEE 802.11 standards). After successfully establishing a RRC connection, the OCB-mode terminal unit 220*b* is in the RRC_CONNECTED state at 654.

The OCB-mode terminal unit 220*b* may detect that an OCB service is available at the infrastructure unit 210 (e.g., the OCB-mode terminal unit 220*b* may receive common signaling (not shown in FIG. 6C) from the infrastructure unit 210 advertising an OCB service). At 658, the OCB-mode terminal unit 220*b* transmits an uplink signal (e.g., a data or control signal) to the infrastructure unit 210 (received via the infrastructure-based communications interface 212), including an OCB service configuration request. The OCB service configuration request may be forwarded to an OCB service (e.g., hosted on the Internet or other network, not shown in FIG. 6C), and the OCB service configuration response from the OCB service may be communicated, via the infrastructure unit 210, back to the OCB-mode terminal unit 220*b* at 660.

The OCB-mode terminal unit 220*b* uses the OCB service information in the configuration response to perform service discovery at 661, and determines that the advertised OCB service matches the OCB service required (or requested) by the OCB-mode terminal unit 220*b*. The OCB-mode terminal unit 220*b* may configure itself in accordance with configuration information for the OCB service. The OCB-mode terminal unit 220*b* then conducts OCB communications with the infrastructure unit 210 (e.g., via the OCB communications interface 214) at 662, using the configuration (e.g., operating channel) indicated in the OCB service configuration information.

Figure 7:
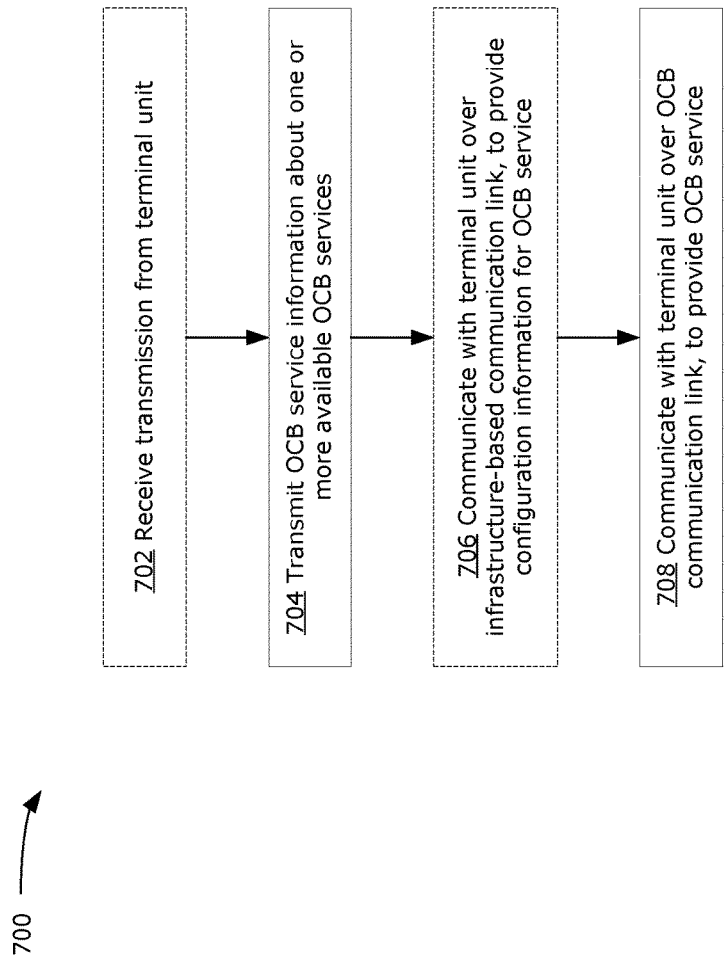
FIG. 7 is a flowchart illustrating an example method that may be performed by an infrastructure unit, in accordance with examples disclosed herein.

FIG. 7 is a flowchart illustrating an example method 700, which may be performed by the infrastructure unit 210. For example, instructions for performing the method 700 may be stored in a memory of the infrastructure unit 210 and may be executed by a processing device of the infrastructure unit 210. The method 700 may at least partly involve some of the signaling illustrated in FIGS. 3, 6A and 6B.

At 702, optionally, the infrastructure unit 210 receives a transmission from a terminal unit 220*b* that is capable of OCB communications. The transmission may be received via the infrastructure-based communications interface 212 of the infrastructure unit 210. The transmission may, for example, be a probe request from the terminal unit 220*b*, or a cellular message (e.g., a paging message, or a heartbeat message) from the terminal unit 220*b*. The transmission from the terminal unit 220*b* may cause the infrastructure unit 210 to respond with a transmission of the OCB service information.

At 704, the infrastructure unit 210 transmits OCB service information about one or more available OCB services in the area. The OCB service information transmitted by the infrastructure unit 210 includes, for each available OCB service, a service identifier (e.g., a service hash) and channel information (e.g., operating class and channel information). The transmission at 704 may be in an infrastructure-based communication, via the infrastructure-based communications interface 212. The type of the transmission at 704 may depend on the type of concurrent infrastructure-based communications supported by the infrastructure unit 210. For example, if the infrastructure unit 210 supports concurrent BSS communications, the OCB service information may be transmitted at 704 via a beacon frame. In another example, if the infrastructure unit 210 supports concurrent cellular communications, the OCB service information may be transmitted at 704 via a RSMI or a RRC signal. In some examples, the OCB service information may be transmitted via an infrastructure-based communication link (e.g., a RRC connection).

The OCB service information may be transmitted following optional step 702. For example, the terminal unit 220*b* may transmit a probe request at optional step 702 and the infrastructure unit 210 may, in response, transmit a probe response containing the OCB service information at step 704. In another example, the terminal unit 220*b* may transmit a paging message or heartbeat message (which may enable the infrastructure unit 210 to determine the location of the terminal unit 220*b*) and the infrastructure unit 210 may, in response, transmit a dedicated signal (e.g., a RRC signal) containing the OCB service information at step 704.

In some examples, the OCB service information may be carried in the OCB operation IE 400, 450, 500, 550 as disclosed herein. For example, the OCB service information may be carried in an IE that includes both a service hash field (or subfield) and an operating class and channel field (or subfield) for each advertised OCB service.

Optionally, at 706, the infrastructure unit 210 may communicate with the terminal unit 220*b* over an infrastructure-based communication link, to provide the terminal unit 220*b* with configuration information for an OCB service. For example, the infrastructure unit 210 and the terminal unit 220*b* may perform association and authentication procedures (e.g., as defined in IEEE 802.11 standards), to enable the terminal unit 220*b* to obtain the configuration information of the OCB service via the infrastructure unit 210.

At 708, the infrastructure unit 210 communicates with the terminal unit 220*b* over an OCB communication link (e.g., via the OCB communications interface 214), to provide the OCB service to the terminal unit 220*b*.

Figure 8:
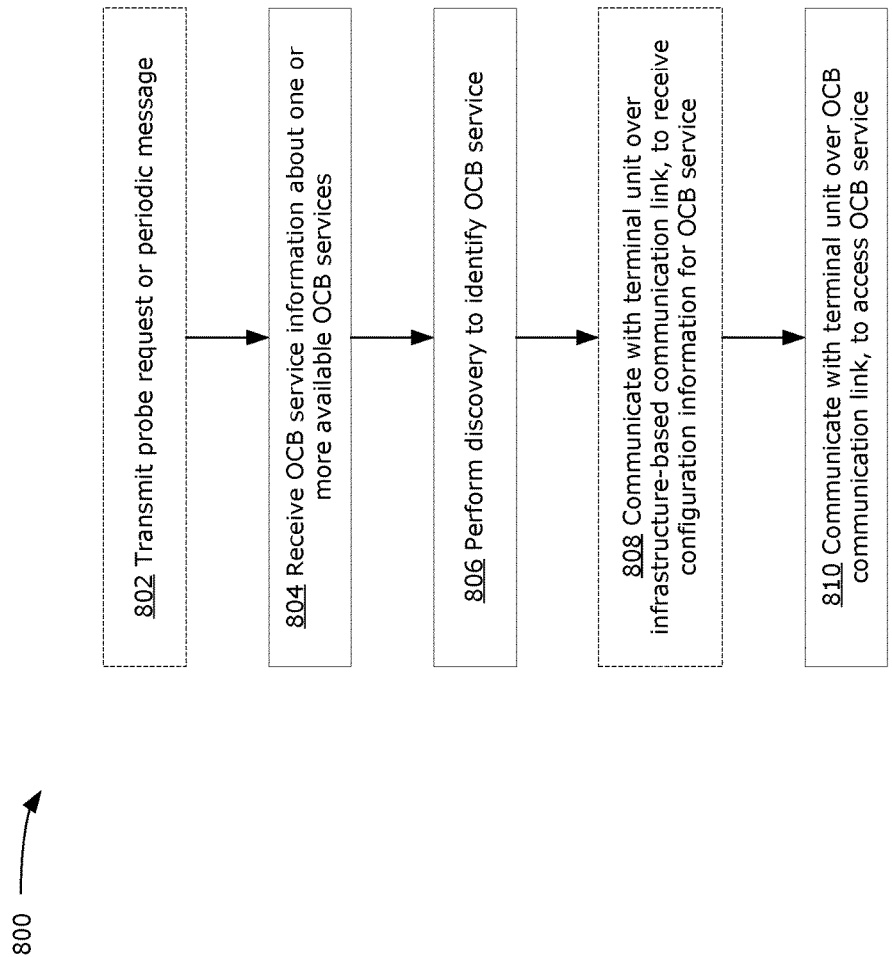
FIG. 8 is a flowchart illustrating an example method that may be performed by a terminal unit, in accordance with examples disclosed herein.

FIG. 8 is a flowchart illustrating an example method 800, which may be performed by the terminal unit 220*b* that is capable of operating in OCB mode. For example, instructions for performing the method 800 may be stored in a memory of the infrastructure unit 220*b* and may be executed by a processing device of the infrastructure unit 220*b*. The method 800 may at least partly involve some of the signaling illustrated in FIGS. 3, 6A and 6B.

At 802, optionally, the terminal unit 220*b* transmits a probe request or a periodic message (e.g., a paging message or a heartbeat message). The transmission at optional step 802 may enable the infrastructure unit 210 to determine the location of the terminal unit 220*b* and/or cause the infrastructure unit 210 to respond with a transmission of the OCB service information.

At 804, the terminal unit 220*b* receives OCB service information about one or more OCB services available via the infrastructure unit 210. The OCB service information received at 804 includes, for each available OCB service, a service identifier (e.g., a service hash) and channel information (e.g., operating class and channel information). The OCB service information may be received in an infrastructure-based communication. The type of the transmission received at 804 may depend on the type of concurrent infrastructure-based communications supported by the infrastructure unit 210. For example, if the infrastructure unit 210 supports concurrent BSS communications, the OCB service information may be received at 804 as a beacon frame. In another example, if the infrastructure unit 210 supports concurrent cellular communications, the OCB service information may be received at 804 as a RSMI or a RRC signal.

In some examples, the OCB service information may be received via an infrastructure-based communication link (e.g., a RRC connection).

In some examples, the OCB service information may be received in the OCB operation IE 400, 450, 500, 550 as disclosed herein. For example, the OCB service information may be carried in an IE that includes both a service hash field (or subfield) and an operating class and channel field (or subfield) for each advertised OCB service. The terminal unit 220b may be configured to parse the received IE to extract values of the service hash field (or subfield) and the operating class and channel field (or subfield) for each advertised OCB service.

At 806, the terminal unit 220b performs discovery to identify an advertised OCB service as the OCB service required (or requested) by the terminal unit 220b. For example, the terminal unit 220b may compare the service hash of each OCB service in the OCB service information with the service hash provisioned at the terminal unit 220b (or the service hash generated from the service name provisioned at the terminal unit 220b). If the service hash matches, the terminal unit 220b may identify that OCB service as the OCB service required (or requested) by the terminal unit 220b.

Optionally, at 808, the terminal unit 220b may communicate with the infrastructure unit 210 over an infrastructure-based communication link, to receive configuration information for the OCB service. For example, the infrastructure unit 210 and the terminal unit 220b may perform association and authentication procedures (e.g., as defined in IEEE 802.11 standards), to enable the terminal unit 220b to obtain the configuration information of the OCB service via the infrastructure unit 210. The terminal unit 220b may configure itself in accordance with the indicated configuration information of the OCB service.

At 810, the terminal unit 220b communicates with the infrastructure unit 210 over an OCB communication link to access the OCB service.

In various examples, the present disclosure has described methods and systems that enable OCB communications to be supported concurrent with infrastructure-based communications (e.g., cellular communications, or BSS communications) at an infrastructure unit (e.g., at an AP or a BS). The present disclosure may support coexistence between OCB-mode devices and infrastructure-mode devices (e.g., regular BSS WLAN devices) in the same band.

The infrastructure unit may advertise OCB service information (e.g., including a service hash and channel information, for each of one or more available OCB services) via a WLAN BSS beacon frame, probe response, or cellular parameter signaling, for example. The present disclosure has described example IEs that may be used by the infrastructure unit to communicate the OCB service information. Terminal units that are capable of operating in OCB mode may discover advertised OCB service(s) (e.g., using the service hash and channel information in the IE).

The methods and systems disclosed herein may enable OCB mode to be used for ITS applications, as well as non-ITS applications (e.g., IoT applications), including operating on unlicensed bands.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for outside the context of a basic service set (OCB) communications, the apparatus comprising: a memory; at least one communications interface supporting OCB communications and at least one same or different communications interface supporting infrastructure-based communications, support for OCB communications being concurrent with support for infrastructure-based communications; and a processing device configured to execute instructions stored in the memory to cause the apparatus to: transmit an infrastructure-based communication advertising OCB service information about one or more available OCB services, the OCB service information including, for each of the one or more available OCB services, a service identifier and channel information, the infrastructure-based communication including an OCB operation information element (IE) including at least, for each of the one or more available OCB services: a service hash field containing a hash value as the service identifier, and an operating class and channel field containing the channel information; and communicate with a terminal unit over an OCB communication link, to provide at least one of the one or more available OCB services to the terminal unit.

2. The apparatus of claim 1, wherein the OCB service information is transmitted in response to receipt of a transmission from the terminal unit.

3. The apparatus of claim 2, wherein the transmission from the terminal unit includes information for determining a location of the terminal unit, and the OCB service information is transmitted in response to determining that the one or more available OCB services are available at the determined location of the terminal unit.

4. The apparatus of claim 1, wherein the OCB service information is transmitted in a probe response or a beacon frame.

5. The apparatus of claim 1, wherein the OCB service information is transmitted in a remaining minimum system information (RMSI) signal or in a radio resource control (RRC) signal.

6. The apparatus of claim 1, wherein the processing device is configured to execute instructions to further cause the apparatus to:
   establish an infrastructure-based communication link with the terminal unit; and
   communicate configuration information for the at least one of the one or more available OCB services over the infrastructure-based communication link.

7. The apparatus of claim 6, wherein the infrastructure-based communication link is one of:
   a cellular communication link; or
   a basic service set (BSS) communication link.

8. The apparatus of claim 1, wherein the OCB operation IE further includes a number of OCB services field indicating a count of the one or more available OCB services.

9. The apparatus of claim 1, wherein the OCB operation IE further includes at least, for at least one of the one or more available OCB services: a service information flags field, a civic location type field, a location civic subelement field, and an optional subelements field; wherein the service information flags field contain information indicating presence of the civic location type field, location civic subelement field, and optional subelements field, and wherein the civic location type field, location civic subelement field, and optional subelements field provide information about a coverage area of the least one OCB service.

10. An apparatus for outside the context of a basic service set (OCB) communications, the apparatus comprising: a memory; at least one communications interface supporting OCB communications; and a processing device configured to execute instructions stored in the memory to cause the apparatus to: receive an infrastructure-based communication advertising OCB service information about one or more available OCB services, the OCB service information including, for each of the one or more available OCB services, a service identifier and channel information, the infrastructure-based communication including an OCB operation information element (IE) including at least, for each of the one or more available OCB services: a service hash field containing a hash value as the service identifier, and an operating class and channel field containing the channel information; and communicate with an infrastructure unit over an OCB communication link, to access an identified OCB service of the one or more available OCB services, the identified OCB service being identified using the received OCB service information.

11. The apparatus of claim 10, wherein the processing device is configured to execute instructions to further cause the apparatus to:
   transmit a probe request or periodic message to the infrastructure unit;
   wherein the OCB service information is received in response to the probe request or periodic message.

12. The apparatus of claim 10, wherein the OCB service information is received in a probe response or a beacon frame.

13. The apparatus of claim 10, wherein the OCB service information is received in a remaining minimum system information (RMSI) signal or in a radio resource control (RRC) signal.

14. The apparatus of claim 13, wherein the OCB service information is received in a RRC signal while the apparatus is in a RRC_CONNECTED state.

15. The apparatus of claim 10, wherein the processing device is configured to execute instructions to further cause the apparatus to:
   establish an infrastructure-based communication link with the infrastructure unit; and
   receive configuration information for at least the identified OCB service over the infrastructure-based communication link.

16. The apparatus of claim 15, wherein the infrastructure-based communication link is one of:
   a cellular communication link; or
   a basic service set (BSS) communication link.

17. The apparatus of claim 10, wherein the OCB operation IE further includes a number of OCB services field indicating a count of the one or more available OCB services.

18. A method for outside the context of a basic service set (OCB) communications, the method comprising: transmitting an infrastructure-based communication advertising OCB service information about one or more available OCB services, the OCB service information including, for each of the one or more available OCB services, a service identifier and channel information the infrastructure-based communication including an OCB operation information element (IE) including at least, for each of the one or more available OCB services: a service hash field containing a hash value as the service identifier, and an operating class and channel field containing the channel information; and communicating with a terminal unit over an OCB communication link, to provide at least one of the one or more available OCB services to the terminal unit.

\* \* \* \* \*